(12) United States Patent
Kang

(10) Patent No.: US 11,567,864 B2
(45) Date of Patent: Jan. 31, 2023

(54) OPERATING METHOD OF STORAGE DEVICE

(71) Applicant: Samsung Electronics Co., Ltd., Suwon-si (KR)

(72) Inventor: Nam Wook Kang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/506,074

(22) Filed: Oct. 20, 2021

(65) Prior Publication Data

US 2022/0050771 A1 Feb. 17, 2022

Related U.S. Application Data

(62) Division of application No. 14/958,050, filed on Dec. 3, 2015, now abandoned.

(30) Foreign Application Priority Data

Dec. 15, 2014 (KR) ........................ 10-2014-0180347

(51) Int. Cl.
*G06F 12/02* (2006.01)
(52) U.S. Cl.
CPC .. *G06F 12/0246* (2013.01); *G06F 2212/7201* (2013.01); *G06F 2212/7209* (2013.01)
(58) Field of Classification Search
None
See application file for complete search history.

(56) References Cited

U.S. PATENT DOCUMENTS

| | | | |
|---|---|---|---|
| 7,039,781 B2 | 5/2006 | Iwata et al. | |
| 7,679,133 B2 | 3/2010 | Son et al. | |
| 7,929,349 B2 | 4/2011 | Seol et al. | |
| 8,015,347 B2 | 9/2011 | Kitsunai et al. | |
| 8,180,953 B2 | 5/2012 | Chu | |
| 8,473,668 B2 | 6/2013 | Kim et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,681,554 B2 | 3/2014 | Suzuki | |
| 8,886,868 B2 | 11/2014 | Kitsunai et al. | |
| 8,929,143 B2 | 1/2015 | Suzuki | |
| 2010/0049907 A1* | 2/2010 | Kitsunai ............... G06F 3/0619 711/E12.008 |
| 2011/0225388 A1 | 9/2011 | Oh et al. | |
| 2011/0233648 A1 | 9/2011 | Seol et al. | |
| 2011/0299317 A1 | 12/2011 | Shaeffer et al. | |

(Continued)

FOREIGN PATENT DOCUMENTS

| | | |
|---|---|---|
| JP | 2004-296014 A | 10/2004 |
| JP | 2014-512616 A | 5/2014 |

(Continued)

*Primary Examiner* — Tracy C Chan
(74) *Attorney, Agent, or Firm* — Harness, Dickey & Pierce, P.L.C.

(57) ABSTRACT

An operation method a storage device including a nonvolatile memory and a memory controller configured to control the nonvolatile memory is provided. The operation method includes erasing memory cells of the nonvolatile memory using the memory controller and prohibiting an erase of the erased memory cells for a critical time using the memory controller.

16 Claims, 20 Drawing Sheets

(56) References Cited

U.S. PATENT DOCUMENTS

2013/0051144 A1*   2/2013   Suzuki .................. G06F 3/064
                                                    365/185.11
2013/0132650 A1    5/2013   Choi et al.
2013/0275655 A1*  10/2013   Chang ................ G06F 12/0246
                                                    711/E12.008

FOREIGN PATENT DOCUMENTS

| KR | 100538338 B1   | 12/2005 |
| KR | 100845552 B1   | 7/2008  |
| KR | 2008-0079977 A | 9/2008  |
| KR | 2010-0013485 A | 2/2010  |
| KR | 100984829 B1   | 10/2010 |
| KR | 101430637 B1   | 8/2014  |

* cited by examiner

FIG. 7

| BLK1 | | BLK2 | | BLK3 | | BLK4 | |
|---|---|---|---|---|---|---|---|
| PPN1 | Valid | PPN5 | Valid | PPN9 | Valid | PPN13 | Valid |
| PPN2 | Valid | PPN6 | Valid | PPN10 | Valid | PPN14 | Valid |
| PPN3 | Valid | PPN7 | Valid | PPN11 | Valid | PPN15 | Valid |
| PPN4 | Valid | PPN8 | Valid | PPN12 | Valid | PPN16 | Valid |
| VCNT = 4 | | VCNT = 4 | | VCNT = 4 | | VCNT = 4 | |

| LPN | PPN |
|---|---|
| LPN1 | PPN5 |
| LPN2 | PPN6 |
| LPN3 | PPN7 |
| LPN4 | PPN8 |
| LPN5 | PPN9 |
| LPN6 | PPN10 |
| LPN7 | PPN11 |
| LPN8 | PPN12 |
| LPN9 | PPN1 |
| LPN10 | PPN2 |
| LPN11 | PPN3 |
| LPN12 | PPN4 |
| LPN13 | PPN13 |
| LPN14 | PPN14 |
| LPN15 | PPN15 |
| LPN16 | PPN16 |

T2

BLK2: LPN1–LPN4
BLK3: LPN5–LPN8
BLK1: LPN9–LPN12
BLK4: LPN13–LPN16

| BLK1 | | BLK2 | | BLK3 | | BLK4 | |
|---|---|---|---|---|---|---|---|
| PPN1 | Valid | PPN5 | Invalid | PPN9 | Valid | PPN13 | Valid |
| PPN2 | Valid | PPN6 | Invalid | PPN10 | Valid | PPN14 | Valid |
| PPN3 | Valid | PPN7 | Invalid | PPN11 | Valid | PPN15 | Valid |
| PPN4 | Valid | PPN8 | Invalid | PPN12 | Valid | PPN16 | Valid |
| VCNT = 4 | | VCNT = 0 | | VCNT = 4 | | VCNT = 4 | |

| LPN | PPN |
|---|---|
| LPN1 | Free |
| LPN2 | |
| LPN3 | |
| LPN4 | |
| LPN5 | PPN9 |
| LPN6 | PPN10 |
| LPN7 | PPN11 |
| LPN8 | PPN12 |
| LPN9 | PPN1 |
| LPN10 | PPN2 |
| LPN11 | PPN3 |
| LPN12 | PPN4 |
| LPN13 | PPN13 |
| LPN14 | PPN14 |
| LPN15 | PPN15 |
| LPN16 | PPN16 |

T2, UA, BLK3 (LPN5–LPN8), BLK1 (LPN9–LPN12), BLK4 (LPN13–LPN16)

FIG. 15

| LPN | PPN |
|---|---|
| LPN1 | Don't care |
| LPN2 | |
| LPN3 | |
| LPN4 | |
| LPN5 | PPN9 |
| LPN6 | PPN10 |
| LPN7 | PPN11 |
| LPN8 | PPN12 |
| LPN9 | Don't care |
| LPN10 | |
| LPN11 | |
| LPN12 | |
| LPN13 | |
| LPN14 | |
| LPN15 | |
| LPN16 | |
| LPN17 | PPN5 ← Virtual mapping of BLK2 |
| LPN18 | PPN1 ← Virtual mapping of BLK1 |
| LPN19 | PPN13 ← Virtual mapping of BLK4 |

T2

BLK3 = {LPN5–LPN8}

UA = {LPN1–LPN16}
OORA = {LPN17–LPN19}

FIG. 18

| LPN | PPN |
|---|---|
| LPN1 | |
| LPN2 | |
| LPN3 | |
| LPN4 | |
| LPN5 | |
| LPN6 | |
| LPN7 | |
| LPN8 | Don't care |
| LPN9 | |
| LPN10 | |
| LPN11 | |
| LPN12 | |
| LPN13 | |
| LPN14 | |
| LPN15 | |
| LPN16 | |
| LPN17 | PPN5 | ← Released
| LPN18 | PPN1 | ← Virtual mapping of BLK1
| LPN19 | PPN13 | ← Virtual mapping of BLK4
| LPN20 | PPN9 | ← Virtual mapping of BLK3

T2

UA: LPN1–LPN16
OORA: LPN18–LPN20

OPERATING METHOD OF STORAGE DEVICE

CROSS-REFERENCE TO RELATED APPLICATIONS

This U.S. non-provisional patent application is a divisional of U.S. application Ser. No. 14/958,050, filed Dec. 3, 2015, which claims priority under 35 U.S.C. § 119 of Korean Patent Application No. 10-2014-0180347, filed on Dec. 15, 2014, the entire contents of each of which are hereby incorporated by reference.

BACKGROUND

The present disclosure relates to a semiconductor memory, and more particularly, to an operating method of a storage device.

A storage device is a device storing data according to a control of a host device such as a computer, a smart phone, a smart pad, etc. A storage device includes a device storing data in a magnetic disk such as a HDD (hard disk drive) and a device storing data in a semiconductor memory, in particular, a nonvolatile memory such as a SSD (solid state drive), a memory card, etc.

A nonvolatile memory includes a ROM (read only memory), a PROM (programmable ROM), an EPROM (electrically programmable ROM), an EEPROM (electrically erasable and programmable ROM), a flash memory, a PRMA (phase-change RAM), a MRAM (magnetic RAM), a RRAM (resistor RAM), a FRAM (ferroelectric RAM), etc.

As a semiconductor manufacturing technology develops, high integration and large capacity of a storage device have been achieved continuously. High integration of a storage device reduces a production cost of the storage device. However, as a scale of the storage device is reduced and a structure of the storage device is changed because of high integration of the storage device, various problems that were not found before are found. Various problems being newly found may damage data stored in the storage device and thereby reliability of the storage device may be degraded. A method and a device that can improve reliability of the storage device are continuously demanded.

SUMMARY

Example embodiments of inventive concepts relate to an operation method of a storage device including a nonvolatile memory and a memory controller configured to control the nonvolatile memory. The operation method may include erasing memory cells of the nonvolatile memory using the memory controller; and prohibiting an erase of the erased memory cells for a critical time using the memory controller.

In example embodiments, the prohibiting the erase of the erased memory cells for the critical time may include setting at least some memory cells among the erased memory cells to store valid data, managing a table to indicate valid data is stored in the at least some memory cells, and releasing the at least some memory cells after the critical time has elapsed.

In example embodiments, the memory controller may be configured to select the memory cells as an erase target when valid data is not stored in the memory cells.

In example embodiments, the prohibiting the erase of the erased memory cells for the critical time may include collecting information of memory blocks being erased among memory blocks of the nonvolatile memory, and periodically registering the information collected in a slot of an internal table together with an initial count according to a period. Each of the erased memory blocks may be virtually set to store valid data.

In example embodiments, the prohibiting the erase of the erased memory cells for the critical time may further include periodically reducing counts corresponding to the slots of the interval table according to the period.

In example embodiments, the prohibiting the erase of the erased memory cells for the critical time may further include periodically releasing information of a slot have an account which reaches a threshold value among the slots of the interval table according to the period.

In example embodiments, the prohibiting the erase of the erased memory cells for the critical time may further include periodically releasing virtual settings of memory blocks corresponding to a slot have an account which reaches a threshold value among the slots of the interval table according to the period.

In example embodiments, the prohibiting the erase of the erased memory cells for the critical time may further include mapping at least a part of physical addresses of each of the erased memory blocks to a logical address of an out-of-range area of a logical address of the storage device.

In example embodiments, the method may further include storing the interval table in the nonvolatile memory before power-off.

In example embodiments, the method may further include reading the interval table from the nonvolatile memory when power is turned on.

Example embodiments of inventive concepts also relate to an operation method of a storage device including a nonvolatile memory and a memory controller configured to control the nonvolatile memory. The operation method may include programming memory cells of the nonvolatile memory using the memory controller; and prohibiting an erase of the programmed memory cells for critical time.

In example embodiments, the prohibiting the erase of the programmed memory cells for the critical time may include setting at least some memory cells among the programmed memory cells to store valid data, managing the table to indicate valid data is stored in at least some memory cells, and releasing the setting of at least some memory cells after the critical time has elapsed.

In example embodiments, the prohibiting the erase of the program memory cells for the critical time may include collecting information of memory blocks being programmed among memory blocks of the nonvolatile memory, and periodically registering the information being collected in a slot of an interval table together with an initial count according to a period. Each of the program memory blocks may be virtually set to store data.

In example embodiments, the collecting the information of memory blocks being programmed may include collecting information of memory blocks in which last memory cells are programmed according to a program order of each memory block.

In example embodiments, the collecting the information memory box being programmed may include collecting information memory blocks in which first memory cells are programmed according to a program order of each memory block.

According to example embodiments, an operation method of a storage device including a nonvolatile memory and a memory controller configured to control the nonvolatile memory is provided. The nonvolatile memory includes a plurality of memory cells. The operation method includes erasing memory cells in one of a plurality of erase operation units of the nonvolatile memory using the memory controller; and at least one of: (i) excluding the memory cells in the one of the plurality of erase operation units as an available erase target for a critical period of time using the memory controller, the critical period of time being based on a time elapsed since the memory cells in the one of the plurality of erase operation units were last erased; and (ii) programming at least some of the memory cells in the one of the plurality of erase operations units and inhibiting the memory cells in the one of the plurality of erase operation units from being erased for a critical length of time using the memory controller, the critical length of time being based on a time elapsed since the at some of the memory cells in the one of the plurality of erase operation units were last programmed.

In example embodiments, the memory cells in the nonvolatile memory may be organized into a plurality of blocks. The memory blocks may each include a plurality of physical pages. The at least one of excluding the memory cells in the one of the plurality of erase operation units as the available erase target and programming at least some of the memory cells in the one of the plurality of erase operation units and inhibiting the memory cells in the one of the plurality of erase operation units from being erased from the critical length of time may include managing a table using the memory controller that maps logical page addresses to the physical pages of the plurality of memory blocks, mapping a virtual page to at least one of the physical pages included in the one of a plurality of erase operation units of the nonvolatile memory after the erasing the one of a plurality of erase operation units of the nonvolatile memory, removing the virtual page mapping to the at least one of the physical pages included in the one of the plurality of erase operation units if one of the critical period of time and the critical length of time has elapsed since the mapping the virtual page, and prohibiting the at least one of the plurality of erase operation units from being erased using the memory controller if any one of the physical pages included in the at least one of the plurality of erase operation units is mapped to the virtual page.

In example embodiments, the at least one of excluding the memory cells in the one of the plurality of erase operation units as the available erase target for the critical period of time using the memory controller and programming the at least some of the memory cells in the one of the plurality of erase operations units and inhibiting the memory cells in the one of the plurality of erase operation units from being erased for the critical length of time using the memory controller may be the excluding the memory cells in the one of the plurality of erase operation units as the available erase target for the critical period of time using the memory controller.

In example embodiments, the at least one of excluding the memory cells in the one of the plurality of erase operation units as the available erase target for the critical period of time using the memory controller and the programming the at least some of the memory cells in the one of the plurality of erase operations units and inhibiting the memory cells in the one of the plurality of erase operation units from being erased for the critical length of time using the memory controller may be the programming the at least some of the memory cells in the one of the plurality of erase operations units and inhibiting the memory cells in the one of the plurality of erase operation units from being erased for the critical length of time using the memory controller.

In example embodiments, the memory cells in the nonvolatile memory may be organized into a plurality of blocks. Each one of the plurality of blocks may include a plurality of strings. Each one of the strings may include a number of the memory cells stacked on top of each other in a vertical direction between a ground selection transistor and a string selection transistor.

BRIEF DESCRIPTION OF THE FIGURES

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 7 illustrates states of memory blocks.

FIG. 8 illustrates mapping information of memory blocks.

FIGS. 10 through 18 illustrate a change of tables according to the timing diagram of FIG. 9.

DETAILED DESCRIPTION OF EXAMPLE EMBODIMENTS

Figure 1:
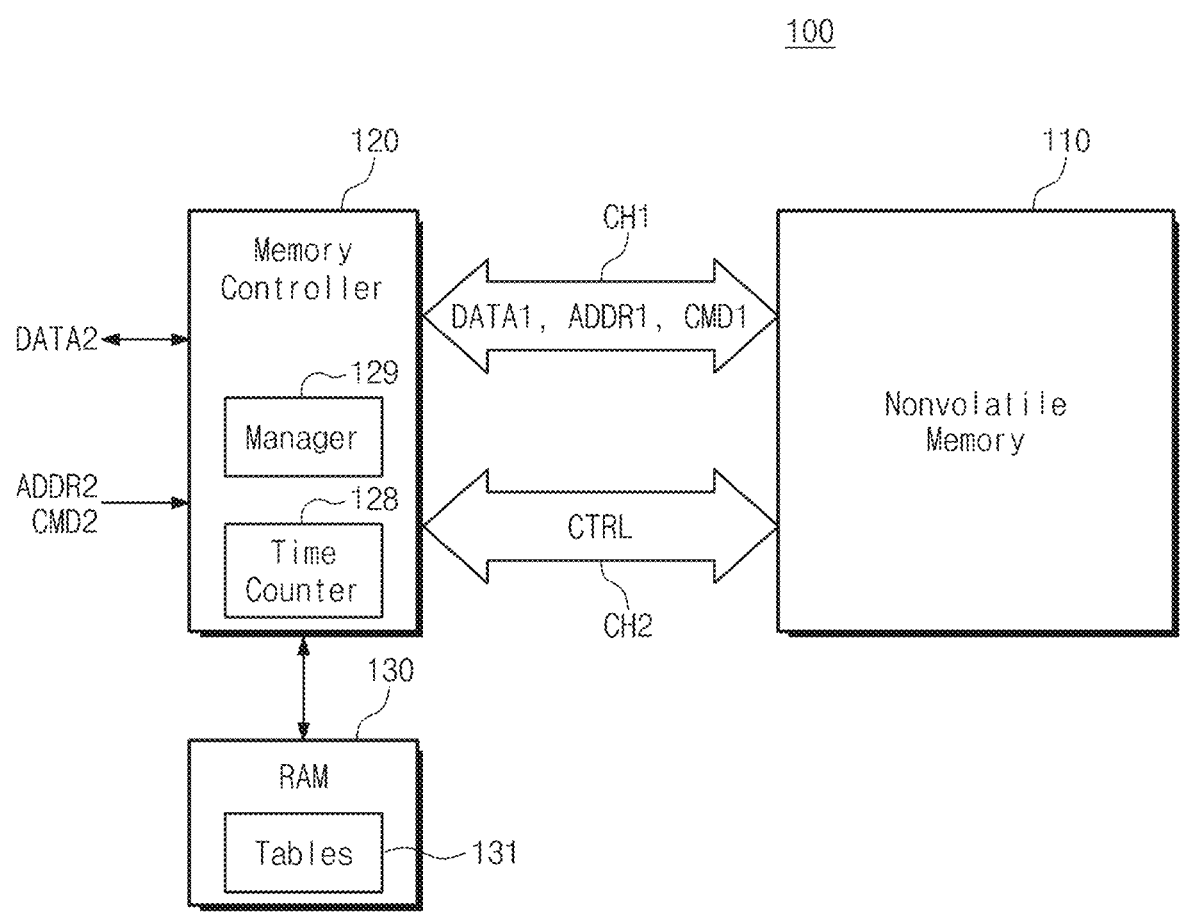
FIG. 1 is a block diagram illustrating a storage device in accordance with example embodiments of inventive concepts.

Example embodiments of inventive concepts will be described more fully hereinafter with reference to the accompanying drawings, in which some example embodiments are shown. Example embodiments of inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. In the drawings, the size, thicknesses, and relative sizes of layers and regions may be exaggerated for clarity. Like numbers refer to like elements throughout.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram illustrating a storage device in accordance with example embodiments of inventive concepts. Referring to FIG. 1, a storage device 100 includes a nonvolatile memory 110, a memory controller 120 and a RAM 130.

The nonvolatile memory 110 can perform write, read and erase operations under the control of the memory controller 120. The nonvolatile memory 110 can exchange first data DATA1 with the memory controller 120. For example, the nonvolatile memory 110 can receive the first data DATA1 from the memory controller 120 and write the first data DATA1 into the nonvolatile memory 110. The nonvolatile memory 110 can perform a read operation and can output the first data DATA1 read to the memory controller 120.

The nonvolatile memory 110 can receive a first command CMD1 and a first address ADDR1 from the memory controller 120. The nonvolatile memory 110 can exchange a control signal CTRL with the memory controller 120. For example, the nonvolatile memory 110 can receive at least one of a chip select signal/CE selecting at least one semiconductor chip among a plurality of semiconductor chips constituting the nonvolatile memory 110, a command latch enable signal CLE indicating that a signal being received from the memory controller 120 is the first command CMD1, a read enable signal/RE which is generated by the memory controller 120 in a read operation and is periodically toggled to be used to adjust the timing, a write enable signal/WE being activated by the memory controller 120 when the first command CMD1 or the first address ADDR1 is transmitted, a write protection signal/WP being activated by the memory controller 120 to protect an unwanted write or erase when power supply is changed, a data strobe signal DQS which is generated by the memory controller 120 in a write operation and is periodically toggled to be used to adjust an input sync of the first data DATA1 from the memory controller 120. The nonvolatile memory 110 can output at least one of a ready and busy signal R/Nb indicating whether the nonvolatile memory 110 is performing a program, erase or read operation and a data strobe signal DQS which is generated from the read enable signal/RE by the nonvolatile memory 110 and is periodically toggled to be used to adjust an output sync of the first data DATA1 to the memory controller 120.

The first data DATA1, the first address ADDR1 and the first command CMD1 can be communicated with the memory controller 120 through a first channel CH1. The first channel CH1 may be an input/output channel. The control signal CTRL can be communicated with the memory controller 120 through a second channel CH2. The second channel CH2 may be a control channel.

The nonvolatile memory 110 may include a flash memory. However, the nonvolatile memory 110 is not limited to include the flash memory. The nonvolatile memory 110 may include at least one of various nonvolatile memories such as a PRAM (phase-change RAM), a MRAM (magnetic RAM), a RRAM (resistive RAM), a FeRAM (ferroelectric RAM), etc.

The memory controller 120 is configured to control the nonvolatile memory 110. For example, the memory controller 120 can control so that the nonvolatile memory 110 performs a write, read or erase operation. The memory controller 120 can exchange the first data DATA1 and the control signal CTRL with the nonvolatile memory 110 and output the first command CMD1 and the first address ADDR1 to the nonvolatile memory 110.

The memory controller 120 can control the nonvolatile memory 110 under the control of an external host device (not shown). The memory controller 120 can exchange second data DATA2 with the host device and receive a second command CMD2 and a second address ADDR2 from the host device.

The memory controller 120 can exchange the first data DATA1 with the nonvolatile memory 110 by a first unit (for example, time unit or data unit) and exchange the second data DATA2 with the host device by a second unit (for example, time unit or data unit) different from the first unit.

The memory controller 120 can exchange the first data DATA1 with the nonvolatile memory 110 according to a first format and transmit the first command CMD1 and the first address ADDR1 to the nonvolatile memory 110. The memory controller 120 can exchange the second data DATA2 with the host device according to a second format different from the first format and receive the second command CMD2 and the second address ADDR2 from the host device.

The memory controller 120 can use the RAM 130 as a buffer memory, a cache memory or an operation memory. For example, the memory controller 120 can receive the second data DATA2 from the host device, store the received second data DATA2 in the RAM 130 and write the second data DATA2 stored in the RAM 130 in the nonvolatile memory 110 as the first data DATA1. The memory controller 120 can receive the first data DATA1 from the nonvolatile memory 110, store the received first data DATA1 in the RAM 130 and output the first data DATA1 stored in the RAM 130 to the host device as the second data DATA2. The memory controller 120 can store data read from the nonvolatile memory 110 in the RAM 130 and write the data stored in the RAM 130 in the nonvolatile memory 110 again.

The memory controller 120 can store data or code needed to manage the nonvolatile memory 110 in the RAM 130. For example, the memory controller 120 can read data or code needed to manage the nonvolatile memory 110 from the nonvolatile memory 110 and load the data or the code in the RAM 130 to drive it.

The memory controller 120 includes a time counter 128 and a table manager 129. The time counter 128 can periodically generate an interrupt signal according to a desired (and/or alternatively predetermined) period. For example, the time counter 128 can periodically generate an interrupt signal in response to a clock signal being generated from the inside of the storage device 100 or a clock signal being received from an external host device.

The table manager 129 is configured to manage tables 131 stored in the RAM 130. For example, the table manager 129 can manage the tables 131 in response to an interrupt signal being generated by the time counter 128. According to a desired (and/or alternatively predetermined) schedule, the table manager 129 can backup or flush the tables 131 stored in the RAM 130 to the nonvolatile memory 110 periodically or when power is turned off. When power is turned on, the table manager 129 can read the tables 131 from the nonvolatile memory 110 to store the table 131 in the RAM 130.

The RAM 130 may include at least one of various random access memories such as a DRAM (dynamic RAM), a SRAM (static RAM), a SDRAM (synchronous DRAM), a PRAM (phase change RAM), a MRAM (magnetic RAM), a RRAM (resistive RAM), a FeRAM (ferroelectric RAM), etc. The RAM 130 can store the tables 131.

To reduce an overhead that an erase operation occurs in the nonvolatile memory 110, the storage device 100 can perform an address mapping. For example, when an overwrite is requested from an external host, the storage device 100 can store overwrite-requested data in memory cells of a free storage space instead of erasing memory cells storing existing data to store the overwrite-requested data in the erased memory cells. The memory controller 120 can drive a FTL (flash translation layer) mapping a logical address being used in an external host device and a physical address being used in the nonvolatile memory 110 according to the method described above. For example, the second address ADDR2 may be a logical address and the first address ADDR1 may be a physical address.

The storage device 100 can perform write, read or erase of data according to a request of a host device. The storage device 100 may include a SSD (solid state drive) or a HDD (hard disk drive). The storage device 100 may include memory cards such as a personal computer memory card international association (PCMCIA) card, a compact flash (CF) card, a smart media card (SM, SMC), a memory stick, a multimedia card (MMC, RS-MMC, MMCmicro), a SD card (SD, miniSD, microSD, SDHC), a universal flash memory device (UFS), etc. The storage device 100 may include a mounted memory such as an eMMC (embedded multimedia card), a UFS, a PPN (perfect page new), etc.

Figure 2:
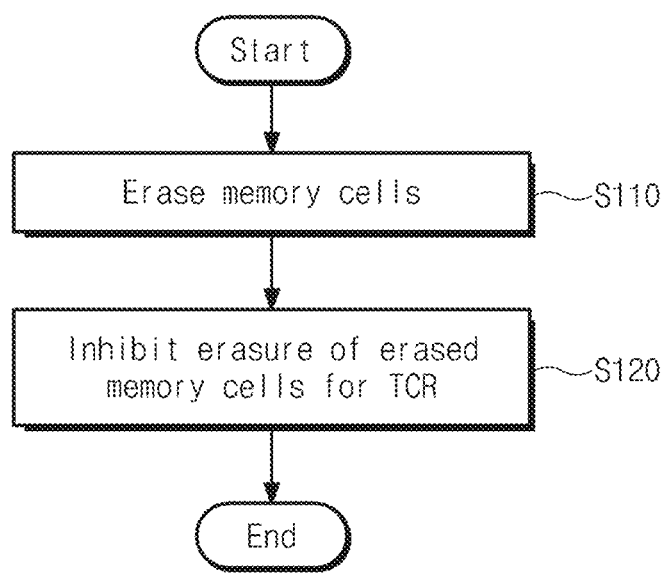
FIG. 2 is a flow chart illustrating an operating method of a storage device in accordance with example embodiments of inventive concepts.

FIG. 2 is a flow chart illustrating an operating method of a storage device in accordance with example embodiments of inventive concepts. Referring to FIGS. 1 and 2, in an operation S110, the memory controller 120 erases memory cells of the nonvolatile memory 110. In an operation S120, the memory controller 120 prohibits an erasure of erased memory cells of the nonvolatile memory 110 for critical time TCR.

If a time interval at which memory cells of the nonvolatile memory 110 are erased is shorter than the critical time TCR, reliability of the memory cells is degraded. The storage device 100 in accordance with example embodiments of inventive concepts improves reliability of the nonvolatile memory 110 by prohibiting an erase of erased memory cells for the critical time TCR.

Figure 3:
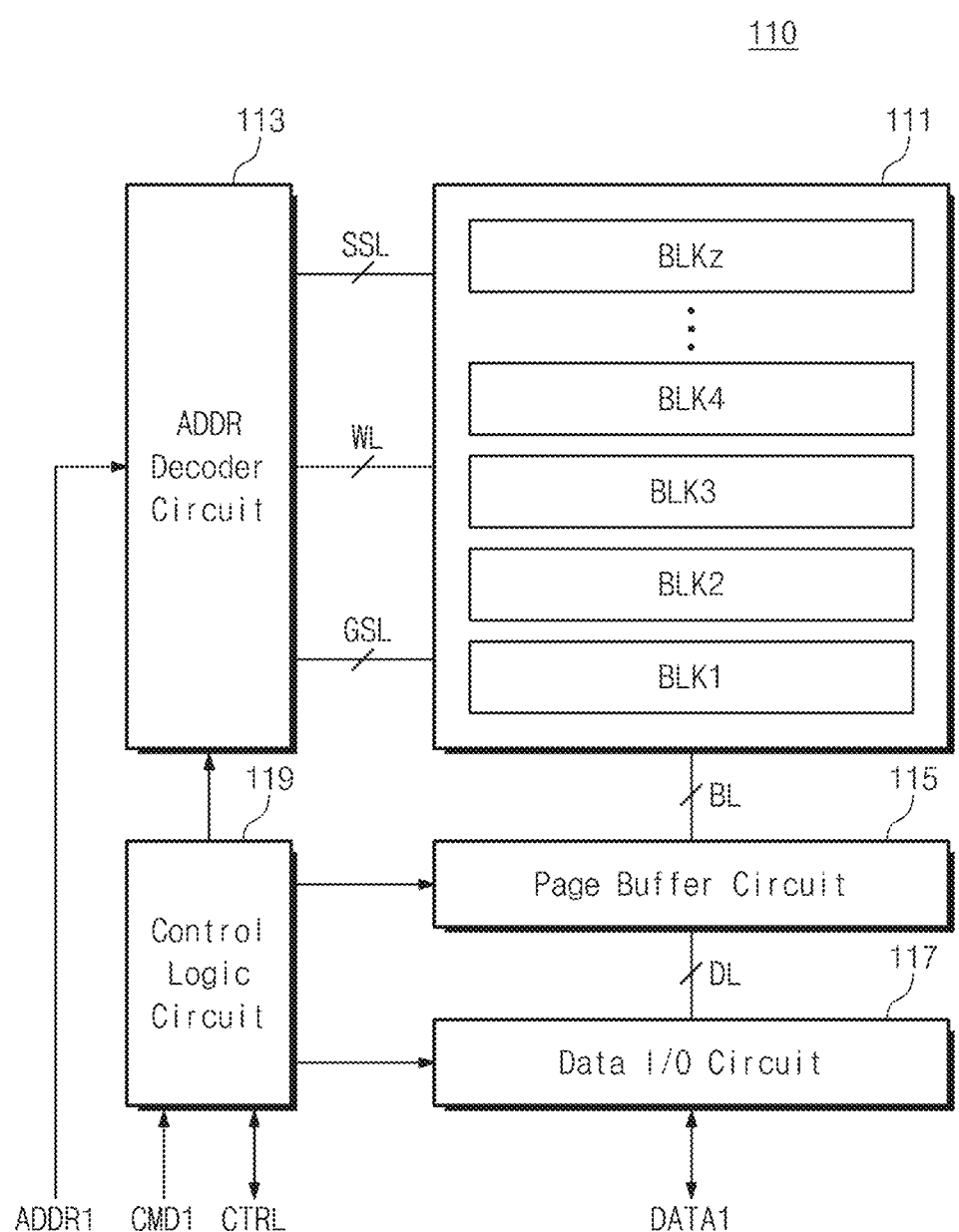
FIG. 3 is a block diagram illustrating a nonvolatile memory in accordance with example embodiments of inventive concepts.

FIG. 3 is a block diagram illustrating a nonvolatile memory in accordance with example embodiments of inventive concepts. Referring to FIGS. 1 and 3, the nonvolatile memory 110 includes a memory cell array 111, an address decoder circuit 113, a page buffer circuit 115, a data input/output circuit 117, and a control logic circuit 119.

The memory cell array 111 includes a plurality of memory blocks BLK1~BLKz. Each memory block includes a plurality of memory cells. Each memory block can be connected to the address decoder circuit 113 through at least one ground select line GSL, a plurality of word lines WL and at least one string select line SSL. Each memory block can be connected to the page buffer circuit 115 through a plurality of bit lines BL. The memory blocks BLK1~BLKz can be connected to the plurality of bit lines BL in common. Memory cells of the memory blocks BLK1~BLKz may have the same structure. Each memory block may be an erase operation unit. Memory cells of the memory cell array 111 may be erased by a memory block unit. Memory cells that belong to one memory block may be erased at the same time. In example embodiments, each memory block may be divided into a plurality of sub blocks and each sub block may be an erase operation unit.

The address decoder circuit 113 is connected to the memory cell array 111 through a plurality of ground select lines GSL, a plurality of word lines WL and a plurality of string select lines SSL. The address decoder circuit 113 operates according to a control of the control logic circuit. The address decoder circuit 113 can receive the first address ADDR1 from the memory controller 120. The address decoder circuit 113 decodes the received first address ADDR1 and can control voltages being applied to the word lines WL according to the decoded address.

For example, in a program operation, the address decoder circuit 113 may apply a program voltage VPGM to a selected word line of a selected memory block indicated by the first address ADDR1 and apply a pass voltage VPASS to unselected word lines of the selected memory block. In a read operation, the address decoder circuit 113 may apply a select read voltage VRD to a selected word line of a selected memory block indicated by the first address ADDR1 and apply an unselect read voltage VREAD to unselected word lines of the selected memory block. In an erase operation, the address decoder circuit 113 may apply an erase voltage (for example, a ground voltage) to word lines of a selected memory block indicated by the first address ADDR1.

The page buffer circuit 115 is connected to the memory cell array 111 through a plurality of bit lines BL. The page buffer circuit 115 is connected to the data input/output circuit 117 through a plurality of data lines DL. The page buffer circuit 115 operates under the control of the control logic circuit 119.

The page buffer circuit 115 can store data to be programmed in memory cells of the memory cell array 111 or data being read from the memory cells. In a program operation, the page buffer circuit 115 can store data to be programmed in the memory cells. On the basis of the stored data, the page buffer circuit 115 can bias a plurality of bit lines BL. In a program operation, the page buffer circuit 115 can function as a write driver. In a read operation, the page buffer circuit 115 can sense voltages of the bit lines BL and store a sensing result. In a read operation, the page buffer circuit 115 can function as a sense amplifier.

The data input/output circuit 117 is connected to the page buffer circuit 115 through the plurality of data lines DL. The data input/output circuit 117 can exchange the first data DATA1 with the memory controller 120.

The data input/output circuit 117 can temporarily store the first data DATA1 being received from the memory controller 120. The data input/output circuit 117 can transmit the stored data to the page buffer circuit 115. The data input/output circuit 117 can temporarily store data being transmitted from the page buffer circuit 115. The data input/output circuit 117 can transmit the stored data to the memory controller 120. The data input/output circuit 117 can function as a buffer memory.

The control logic circuit 119 receives the first command CMD1 from the memory controller 120. The control logic circuit 119 decodes the received first command CMD1 and can control an overall operation of the nonvolatile memory 110 according to the decoded command.

In a read operation, the control logic circuit 119 can generate a data strobe signal DQS from a read enable signal/RE among the received control signals CTRL and output it. In a write operation, the control logic circuit 119 can operate using the data strobe signal DQS among the received control signals CTRL.

Figure 4:
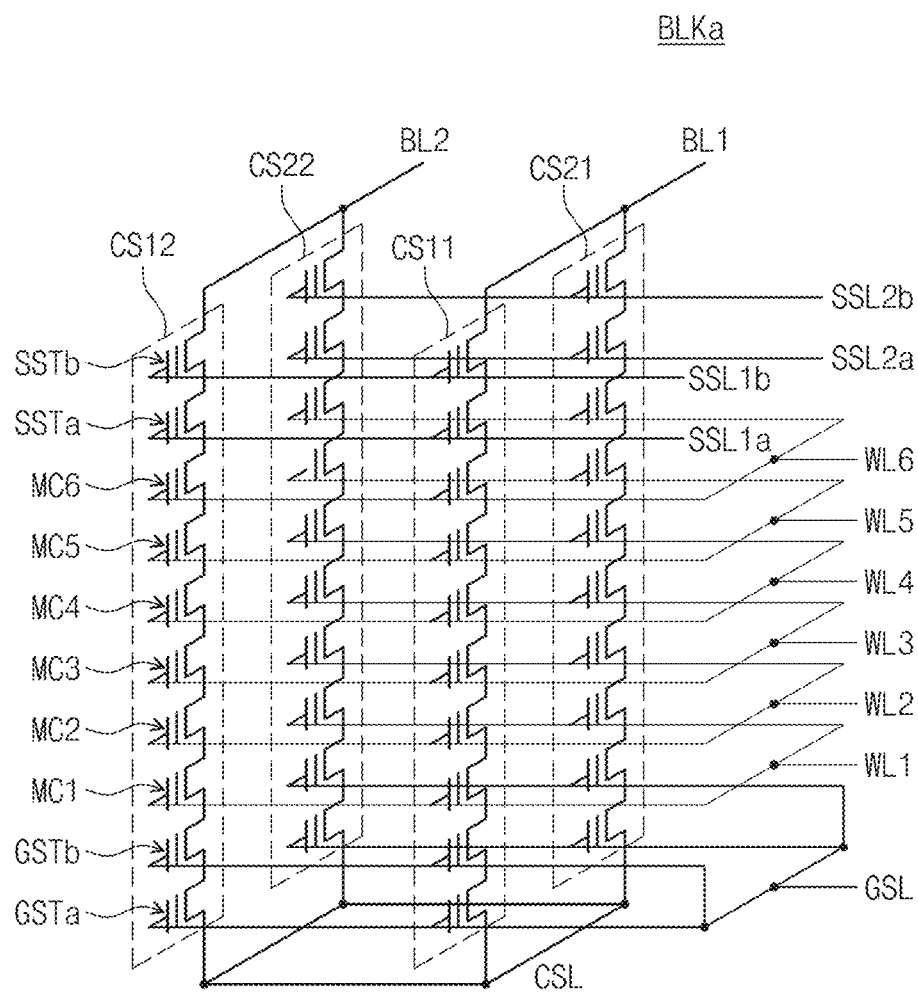
FIG. 4 is a circuit illustrating a memory block in accordance with example embodiments of inventive concepts.
Figure 4:
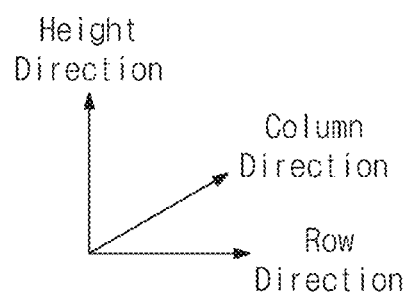

FIG. 4 is a circuit illustrating a memory block BLKa in accordance with example embodiments of inventive concepts. Referring to FIG. 4, the memory block BLKa includes a plurality of cell strings CS11~CS21 and CS12~CS22. The cell strings CS11~CS21 and CS12~CS22 can be arranged along a row direction and a column direction to from rows and columns.

For example, the cell strings CS11 and CS12 arranged along the row direction form a first row and the cell strings CS21 and CS22 arranged along the row direction form a second row. The cell strings CS11 and CS21 arranged along the column direction form a first column and the cell strings CS12 and CS22 arranged along the column direction form a second column.

Each cell string may include a plurality of cell transistors. The cell transistors include ground select transistors GSTa and GSTb, memory cells MC1~MC6, and string select transistors SSTa and SSTb. The ground select transistors GSTa and GSTb, the memory cells MC1~MC6, and the string select transistors SSTa and SSTb of each cell string may be stacked in a direction perpendicular to a plane (for example, a plane on a substrate of the memory block BLKa) on which the cell strings CS11~CS21 and CS12~CS22 are arranged along rows and columns.

The cell transistors may be charge trap type transistors having threshold voltages that are changed depending on a charge amount trapped in an insulating layer.

The lowermost ground select transistor GSTa may be connected to a common source line CSL in common.

The ground select transistors GSTa and GSTb of the cell strings CS11~CS21 and CS12~CS22 may be connected to a ground select line GSL in common.

Ground select transistors having the same height (or order) are connected to the same ground select line and ground select transistors having different heights (or orders) are connected to the different ground select lines. For example, the ground select transistors GSTa having a first height may be connected to a first ground select line in common and the ground select transistors GSTb having a second height may be connected to a second ground select line in common.

Ground select transistors of the same row are connected to the same ground select line and ground select transistors of different rows may be connected to different ground select lines. For example, the ground select transistors GSTa and GSTb of the cell strings CS11 and CS12 of a first row may be connected to the first ground select line and the ground select transistors GSTa and GSTb of the cell strings CS21 and CS22 of a second row may be connected to the second ground select line.

Memory cells located at the same height (or order) from a substrate (or ground select transistors GST) may be connected to one word line in common and memory cells located at different heights (or orders) from the substrate (or ground select transistors GST) may be connected to different word lines WL1~WL6. For example, memory cells MC1 are connected to the word line WL1 in common. Memory cells MC2 are connected to the word line WL2 in common. Memory cells MC3 are connected to the word line WL3 in common. Memory cells MC4 are connected to the word line WL4 in common. Memory cells MC5 are connected to the word line WL5 in common. Memory cells MC6 are connected to the word line WL6 in common.

In the first string select transistors SSTa of the same height (or order) of the cell strings CS11~CS21 and CS12~CS22, the first string select transistors SSTa of different rows are connected to different string select lines SSL1a~SSL2a respectively. For example, the first string select transistors SSTa of the cell strings CS11 and CS12 are connected to the string select line SSL1a in common. The first string select transistors SSTa of the cell strings CS21 and CS22 are connected to the string select line SSL2a in common.

In the second string select transistors SSTb of the same height (or order) of the cell strings CS11~CS21 and CS12~CS22, the second string select transistors SSTb of different rows are connected to different string select lines SSL1b~SSL2b respectively. For example, the second string select transistors SSTb of the cell strings CS11 and CS12 are connected to the string select line SSL1b in common. The second string select transistors SSTb of the cell strings CS21 and CS22 are connected to the string select line SSL2b in common.

That is, cell strings of different rows are connected to different string select lines. String select transistors of the same height (or order) of cell strings of the same row are connected to the same string select line. String select transistors of different heights (or orders) of cell strings of the same row are connected to different string select lines.

String select transistors of cell strings of the same row may be connected to one string select line in common. For example, the string select transistors SSTa and SSTb of the cell strings CS11 and CS12 of the first row may be connected to one string select line in common. The string select transistors SSTa and SSTb of the cell strings CS21 and CS22 of the second row may be connected to one string select line in common.

Columns of the cell strings CS11~CS21 and CS12~CS22 are connected to different bit lines BL1 and BL2 respectively. For example, the string select transistors SSTb of the cell strings CS11~CS21 of the first column may be connected to the bit line BL1 in common. The string select transistors SSTb of the cell strings CS12~CS22 of the second column may be connected to the bit line BL2 in common.

The cell strings CS11 and CS12 may form a first plane. The cell strings CS21 and CS22 may form a second plane.

In the memory block BLKa, write and read operations may be performed by a row unit. For example, one plane of the memory block BLKa may be selected by the string select lines SSL1a, SSL1b, SSL2a and SSL2b. When a turn-on voltage is supplied to the string select lines SSL1a and SSL1b and a turn-off voltage is supplied to the string select lines SSL2a and SSL2b, the cell strings CS11 and CS12 of the first plane are connected to the bit lines BL1 and BL2. That is, the first plane is selected. When a turn-on voltage is supplied to the string select lines SSL2a and SSL2b and a turn-off voltage is supplied to the string select lines SSL1a and SSL1b, the cell strings CS21 and CS22 of the second plane are connected to the bit lines BL1 and BL2. That is, the second plane is selected. In the selected plane, one row of the memory cells MC may be selected by the word lines WL1~WL6. In the selected plane, a write or read operation may be performed.

In the memory block BLKa, an erase operation may be performed by a memory block unit or a sub block unit. When an erase operation is performed by a memory block unit, all the memory cells MC of the memory block BLKa may be erased at the same time according to one erase request. When an erase operation is performed by a sub memory block unit, a part of the memory cells MC of the memory block BLKa may be erased at the same time according to one erase request and the other part of the memory cells MC may be erase-prohibited. A low voltage (for example, a ground voltage) is supplied to a word line connected to memory cells being erased and a word line connected to erase-prohibited memory cells may be floated.

The memory block BLKa illustrated in FIG. 4 is illustrative. Example embodiments of inventive concepts are not limited to the memory block BLKa illustrated in FIG. 4. For example, the number of cell strings may increase or decrease. As the number of cell strings is changed, the number of string select lines or ground select lines connected to rows of the cell strings and the number of cell strings connected to one bit line may also be changed.

The number of columns of the cell string may increase or decrease. As the number of columns of the cell string is changed, the number of bit lines connected to columns of the cell strings and the number of cell strings connected to one string select line may also be changed.

Heights of the cell strings may increase or decrease. For example, the number of ground select transistors, memory cells or string select transistors being stacked on each of the cell strings may be increase or decrease.

Memory cells MC that are connected to one word line and belong to one row may correspond to at least three pages. For example, k (k is a positive integer greater than 2) number of bits can be programmed in one memory cell. In the memory cells MC that are connected to one word line and belong to one row, k number of bits being programmed in each of the memory cells MC may form k number of pages.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

In example embodiments, the 3D memory array may include vertical NAND strings that are vertically oriented such that at least one memory cell is located over another memory cell. The at least one memory cell may comprise a charge trap layer. Each vertical NAND string may further include at least one select transistor located over memory cells. The at least one select transistor may have the same structure with the memory cells and may be formed monolithically together with the memory cells.

Figure 5:
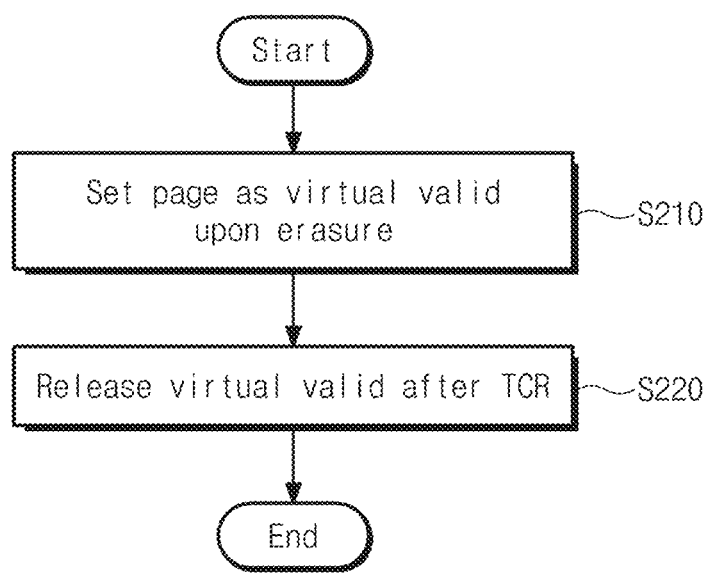
FIG. 5 is a flow chart illustrating an example of a method of prohibiting an erase of memory cells according to example embodiments of inventive concepts.

FIG. 5 is a flow chart illustrating example of a method (operation S120) of prohibiting an erase of memory cells according to example embodiments of inventive concepts. Referring to FIGS. 1, 3, 4 and 5, in an operation S210, the memory controller 120, after erasing the memory block BLKa, sets at least one page that belongs the memory block BLKa as a virtual valid. For example, the tables 131 may include information about memory blocks BLK1~BLKz. The table manager 129 can manage the tables 131 to indicate that valid data is stored in at least one page of the memory block BLKa. For example, the table manager 129 can set a virtual valid at the same time erasing the memory block BLKa, immediately before erasing the memory block BLKa or immediately after erasing the memory block BLKa.

According to a desired (and/or alternatively predetermined) schedule or a request of an external host device, the memory controller 120 can select a memory block to be erased among the memory blocks BLK1~BLKz of the nonvolatile memory 110. The memory controller 120 is configured to select a memory block to be erased among memory blocks not storing valid data. Thus, if it is set that valid data is stored in at least one page of the memory block BLKa, the memory block BLKa may be excluded from an erase target.

In an operation S220, the memory controller 120 can release a virtual valid after the critical time TCR. For example, the table manager 129 can determine whether critical time TCR has passed after a virtual valid is set in the memory block BLKa on the basis of time information being output from the time counter 128. After it is determined that critical time TCR has passed, the table manager 129 can release the virtual valid set in the memory block BLKa.

If the virtual valid is released, the memory block BLKa may be selected as an erase target. For example, after the memory block BLKa is erased, data may be programmed in the memory block BLKa. Data programmed in the memory block BLKa may be invalidated according to a request of an external host device or an internal schedule. If the virtual valid of the memory block BLKa is released and data programmed in the memory block BLKa is set as invalid data, it is distinguished that the memory block BLKa does not store valid data. Thus, the memory block BLKa may be selected as an erase target.

Figure 6:
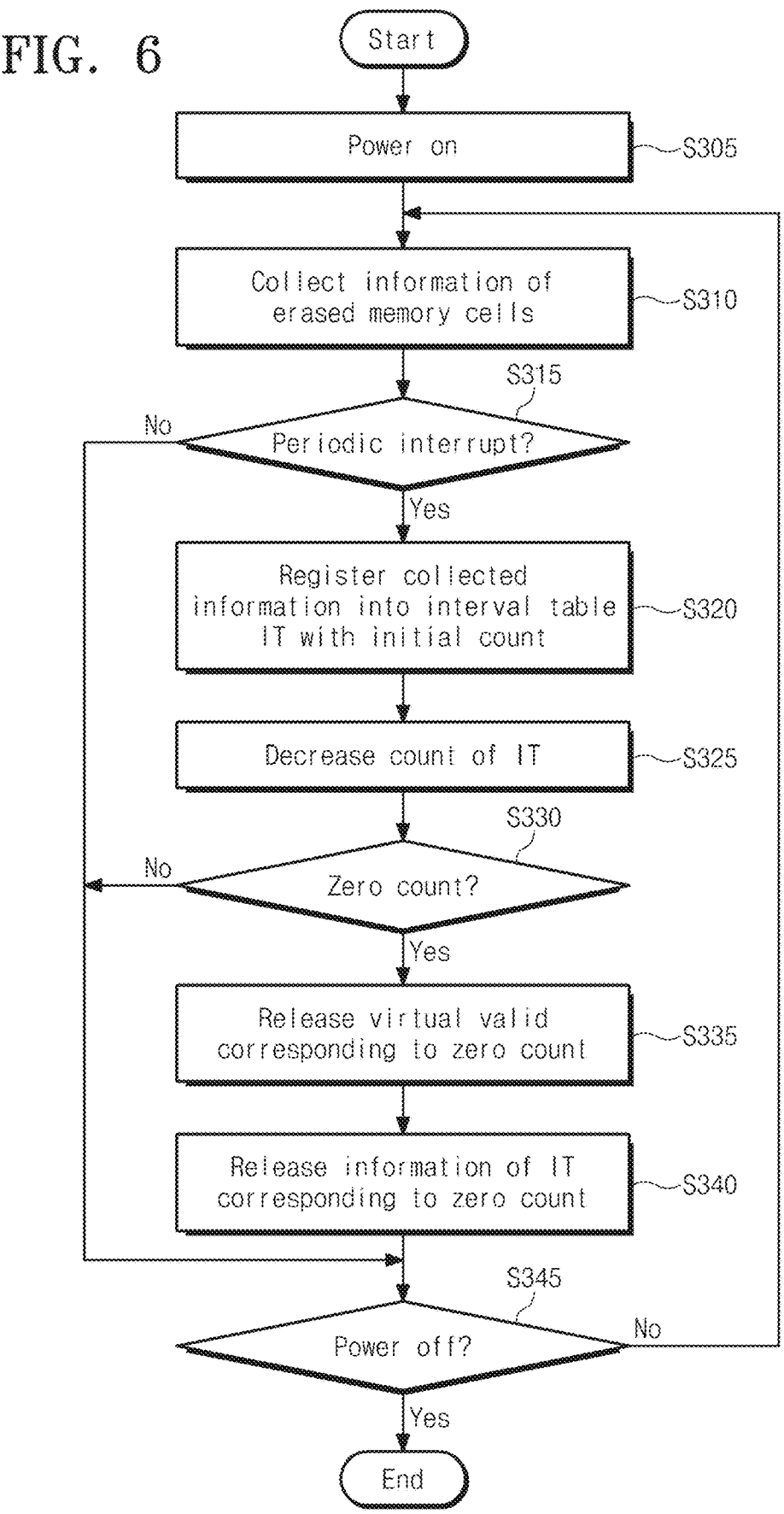
FIG. 6 is a flow chart illustrating an example of a method of releasing a virtual valid according to example embodiments of inventive concepts.

FIG. 6 is a flow chart illustrating an example of a method (S220) of releasing a virtual valid according to example embodiments of inventive concepts. Referring to FIGS. 1, 3, 4 and 6, in an operation S305, power may be supplied to the storage device 100. In the case that the tables 131 is backed up or flushed to the nonvolatile memory 110, the tables 131 may be loaded in the RAM 130 from the nonvolatile memory 110 when power is supplied to the storage device 100.

In an operation S310, the memory controller 120 collects information of memory cells being erased. For example, the table manager 129 can collect information of memory blocks being erased (or other erase unit like a sub block). The table manager 129 can collect information of memory blocks being erased during a desired (and/or alternatively predetermined) period managed by the time counter 128.

In an operation S315, the memory controller 120 determines whether a periodical interrupt occurs. For example, it may be determined whether an interrupt signal is output from the time counter 128.

If an interrupt signal is output, in an operation S320, the memory controller 120 registers the collected information in an interval table IT together with an initial counter. For example, the tables 131 may include the interval table IT. The table manager 129 can register information of the erased memory blocks and the initial counter in the interval table IT.

In an operation S325, the table manager 129 reduces counters of the information previously registered in the interval table IT.

In an operation S330, the table manager 129 determines whether information corresponding to '0' counter exists among the information registered in the interval table IT.

If information corresponding to '0' counter exists, in an operation S335, the table manager 129 releases a virtual valid of the information corresponding to the '0' counter. For example, the table manager 129 can detect an address of the memory block (or other erase unit like a sub block) from the information corresponding to the '0' counter of the interval table IT. The table manager 129 can release a virtual valid of the memory block corresponding to the detected address.

In an operation S340, the table manager 129 can release information corresponding to the '0' counter from the interval table IT.

In an operation S345, if the storage device 100 is not powered off, the operation S310 is performed again.

The operations S310 through S340 may be repeatedly performed while power is supplied to the storage device 100. When the memory block BLKa is erased, at least one page of the memory block BLKa is set to a virtual valid. Information of the memory block BLKa is registered in the interval table IT. As the operations S310 through S340 are repeated, a counter of the memory block BLKa decreases from the initial counter. Until the counter of the memory block BLKa is reduced to '0', the memory block BLKa is erase-prohibited due to the virtual valid.

A first table T1 of FIG. 7 illustrates states of memory blocks BLK1~BLK4. A second table T2 of FIG. 8 illustrates mapping information of memory blocks BLK1~BLK4. Referring to FIGS. 7 and 8, it is assumed that each of the memory blocks BLK1~BLK4 has four pages. Pages of the first memory block BLK1 corresponds to first through fourth physical page addresses PPN1~PPN4 respectively. Pages of the second memory block BLK2 corresponds to fifth through eighth physical page addresses PPN5~PPN8 respectively. Pages of the third memory block BLK3 corresponds to ninth through twelfth physical page addresses PPN9~PPN12 respectively. Pages of the fourth memory block BLK4 corresponds to thirteenth through sixteenth physical page addresses PPN13~PPN16 respectively. For example, the physical page addresses PPN1~PPN16 may correspond to a first address ADDR1 which is transmitted to the nonvolatile memory 110 by the memory controller 120.

The first table T1 may include information about whether valid data is stored in pages of the memory blocks BLK1~BLK4. It is assumed that each of the first through sixteenth physical page addresses PPN1~PPN16 stores valid data.

The first table T1 may further include information about the number of pages in which valid data is stored in each of the memory blocks BLK1~BLK4, that is, a valid count VCNT. It is assumed that the valid counts VCNT of the memory blocks BLK1~BLK4 are each 4.

The second table T2 includes mapping information between the physical page addresses PPN1~PPN16 and logical page addresses LPN1~LPN16. For example, the memory controller 120 can divide second data DATA2 being received from an external host device into a page unit of the nonvolatile memory 110. The memory controller 120 can convert a second address ADDR2 being received from the nonvolatile memory 110 together with the second data DATA2 into the logical page addresses LPN1~LPN16. The data divided into a page unit may be related to the logical page addresses LPN1~LPN16. For example, the logical page addresses LPN1~LPN16 can form a user area UA that an external host device identifies as a storage space of the storage device 100.

The memory controller 120 can map the logical page addresses LPN1~LPN16 and the physical page addresses PPN1~PPN16 to each other. For example, the first through fourth logical page addresses LPN1~LPN4 may be mapped to the fifth through eighth physical page addresses PPN5~PPN8. When an external host device requests the storage device 100 to access data stored in the first through fourth logical page addresses LPN1~LPN4, the memory controller 120 can access pages of the nonvolatile memory 110 corresponding to the fifth through eighth physical page addresses PPN5~PPN8 of the second memory block BLK2.

The fifth through eighth logical page addresses LPN5~LPN8 can be mapped to the ninth through twelfth physical page addresses PPN9~PPN12 of the third memory block BLK3 respectively. The ninth through twelfth logical page addresses LPN9~LPN12 can be mapped to the first through fourth physical page addresses PPN1~PPN4 of the first memory block BLK1 respectively. The thirteenth through sixteenth logical page addresses LPN13~LPN16 can be mapped to the thirteenth through sixteenth physical page addresses PPN13~PPN16 of the fourth memory block BLK4 respectively.

The first table T1 and the second table T2 are a part of the tables 131 and may be managed by the table manager 129.

Figure 9:
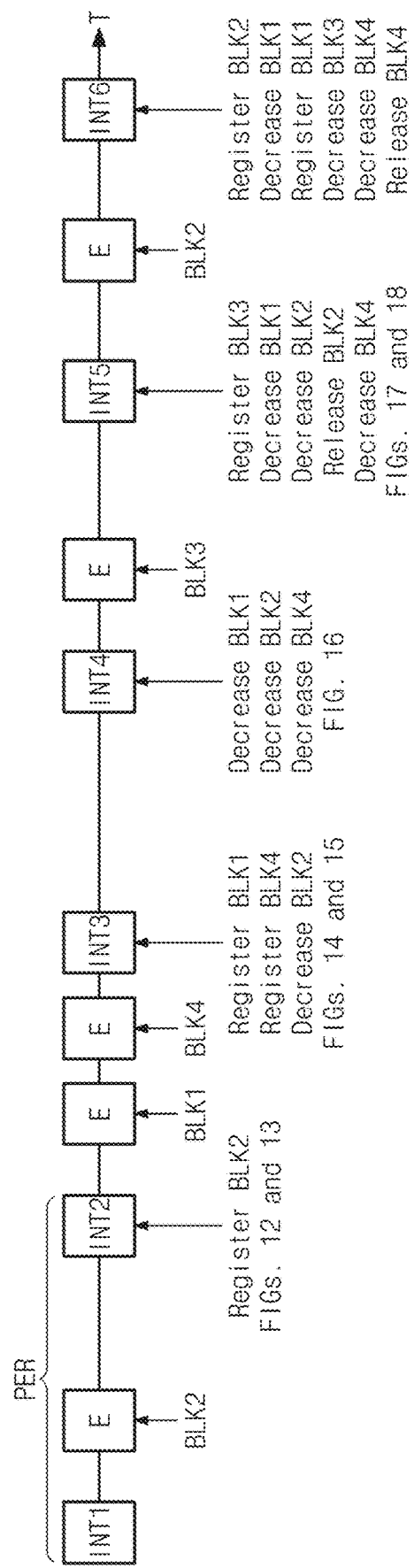
FIG. 9 is a timing diagram illustrating an example that memory blocks are erased with the lapse of time.

FIG. 9 is a timing diagram illustrating an example that memory blocks BLK1~BLK4 are erased with the lapse of time. FIGS. 10 through 18 illustrate a change of tables 131 according to the timing diagram of FIG. 9.

Referring to FIG. 9, first through sixth interrupt signals INT1~INT6 may be sequentially generated by the time counter 128. The first through sixth interrupt signals INT1~INT6 may be generated at desired (and/or alternatively predetermined) time intervals such as a period PER.

The memory controller 120 can collect information of memory blocks (or other erase units like sub blocks) being erased until the second interrupt signal INT2 is generated after the first interrupt signal INT1 is generated. For example, the second memory block BLK2 may be erased before the second interrupt signal INT2 is generated after the first interrupt signal INT1 is generated. The second memory block BLK2 may be erased after data stored in the second memory block BLK2 becomes invalid. An example of the tables 131 of when data stored in the second memory block BLK2 becomes invalid is illustrated in FIGS. 10 and 11.

Referring to FIGS. 1, 3, 4, 10 and 11, data stored in the second memory block BLK2 becomes invalid. If data stored in the second memory block BLK2 becomes invalid, the table manager 129 can renew or update the first table T1 and the second table T2.

For example, in the second table T2, the table manager 129 can delete mappings of the first through fourth logical page addresses LPN1~LPN4 of the second table T2. It may be discriminated that the first through fourth logical page addresses LPN1~LPN4 are free storage spaces as shown in FIG. 11.

The table manager 129 can renew the first table T1 to indicate that invalid data is stored in the physical page addresses PPN5~PPN8 of the second memory block BLK2 as shown in FIG. 10. The table manager 129 can reduce a valid count VCNT to '0'.

Figure 12:
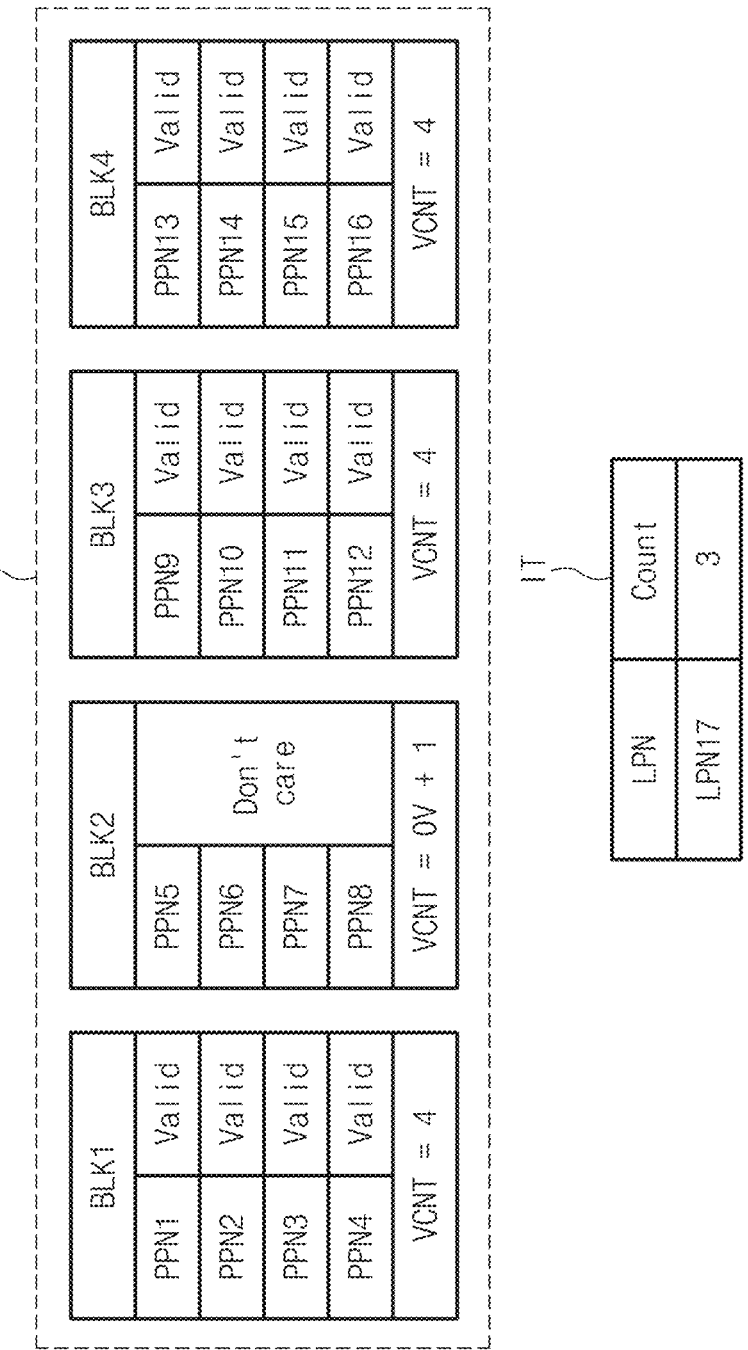

Referring to FIG. 9 again, the table manager 129 can renew the tables 131 in response to the second interrupt signal INT2. An example that the tables 131 are renewed in response to the second interrupt signal INT2 is illustrated in FIGS. 12 and 13.

Figure 13:
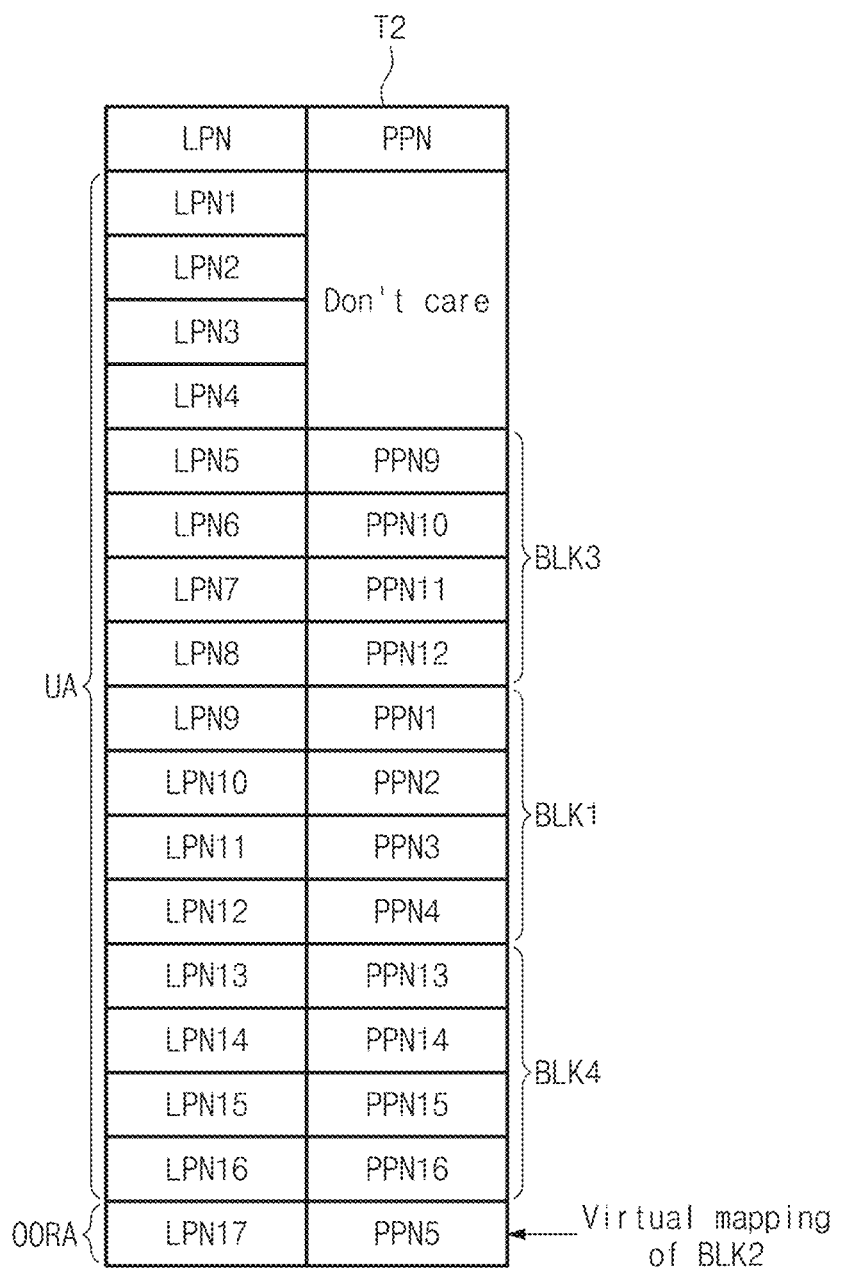

Referring to FIGS. 1, 3, 4, 9, 12 and 13, as described with reference to the operation S210 of FIG. 5, the table manager 129 sets at least one of pages of the second memory block BLK2 as a virtual valid so that the second memory block BLK2 is erase-prohibited. For example, the table manager 129 can add an OORA (out-of-range area) to the second table T2 as shown in FIG. 13. For example, a logical page address LPN of the OORA (out-of-range area) may not belong to the logical page addresses LPN1~LPN6 of the user area UA of the storage device 100. The logical page address LPN of the OORA may be a virtual address which is not discriminated as a storage space of the storage device 100.

As the second memory block BLK2 is erased, the table manager 129 can add a seventeenth logical page address LPN17 to the OORA. The table manager 129 can map at least one physical page address of the physical page addresses PPN5~PPN6 of the second memory block BLK2, for example, the fifth physical page address PPN5 to the seventeenth logical page address LPN17 of the OORA. Since the seventeenth logical page address LPN17 does not correspond to an actual storage space of the storage device 100, a mapping between the seventeenth logical page address LPN17 and the fifth physical page address PPN5 may be a virtual mapping.

The table manager 129 can also renew the first table T1. For example, as the fifth physical page address PPN5 of the second memory block BLK2 is virtually mapped to the seventeenth logical page address LPN17, the table manager 129 can increase a valid count VCNT of the second memory block BLK2 by '1' as shown in FIG. 12. For example, the valid count VCNT of the second memory block BLK2 may be a value that an OV (original value) indicating the number of pages in which valid data is stored among pages of the second memory block BLK2 is increased by '1' by a virtual valid.

As described with reference to the operation S320 of FIG. 6, the table manager 129 can add an interval table IT as a part of the tables 131. For example, the table manager 129 can register the seventeenth logical page address LPN17 related to the virtual valid of the second memory block BLK2 to the interval table IT together with an initial count, for example, '3'.

After the second memory block BLK2 is erased, data may be programmed in the second memory block BLK2. For example, the second table T2 may be renewed so that the physical page addresses PPN5~PPN8 of the second memory block BLK2 are mapped to the first through fourth logical page addresses LPN1~LPN4 again. The first table T1 may be renewed to indicate that valid data is stored in the physical page addresses PPN5~PPN8 of the second memory block BLK2. The time that data is programmed in the second memory block BLK2 is not limited and thereby in the first and second tables T1 and T2, whether valid data is stored in the physical page addresses PPN5~PPN8 and whether the physical page addresses PPN5~PPN8 are mapped to the logical page addresses LPN1~LPN4 are illustrated as don't care.

Referring to FIG. 9 again, the memory controller 120 can collect information of memory blocks (or other erase units like sub blocks) being erased until the third interrupt signal INT3 is generated after the second interrupt signal INT2 is generated. For example, the first and fourth memory blocks BLK1 and BLK4 may be erased before the third interrupt signal INT3 is generated after the second interrupt signal INT2 is generated. As described with reference to FIGS. 10 and 11, the first and fourth memory blocks BLK1 and BLK4 may be erased after data stored in the first and fourth memory blocks BLK1 and BLK4 becomes invalid.

Figure 14:
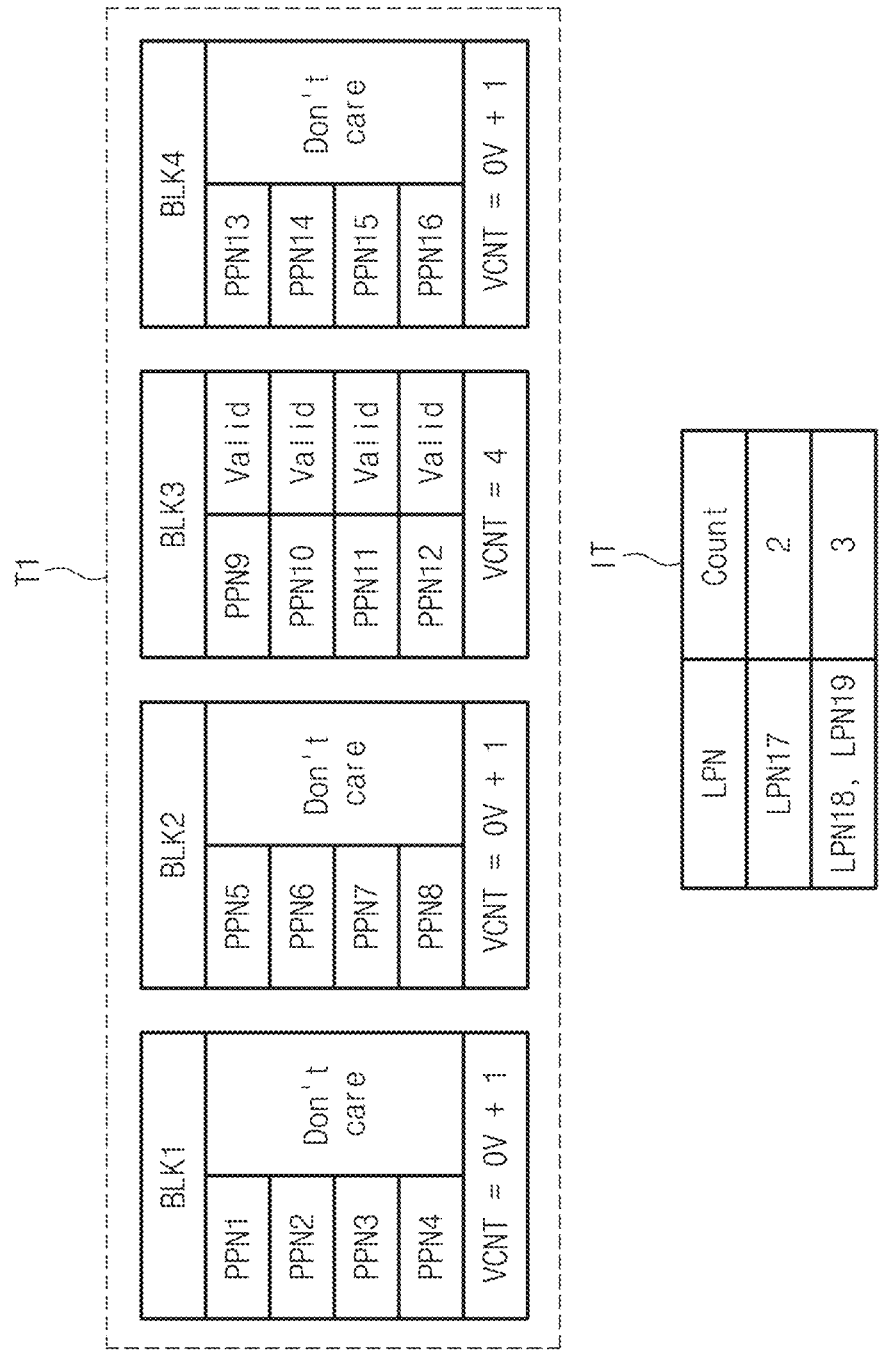

The table manager 129 can renew the tables 131 in response to the third interrupt signal INT3. An example that the tables 131 are renewed in response to the third interrupt signal INT3 is illustrated in FIGS. 14 and 15.

Referring to FIGS. 1, 3, 4, 9, 14 and 15, as described with reference to the operation S210 of FIG. 5, the table manager 129 sets at least one page among pages of the first and fourth memory blocks BLK1 and BLK4 as a virtual valid so that the first and fourth memory blocks BLK1 and BLK4 are erase-prohibited. For example, the table manager 129 can add eighteenth and nineteenth logical page addresses LPN18 and LPN19 to an OORA (out-of-range area) of the second table T2 as shown in FIG. 15. The table manager 129 can map the first and thirteenth physical page addresses PPN1 and PPN13 of the first and fourth memory blocks BLK1 and BLK4 to the eighteenth and nineteenth logical page addresses LPN18 and LPN19 of the OORA (out-of-range area) respectively.

The table manager 129 can also renew the first table T1. For example, as the first and thirteenth physical page addresses PPN1 and PPN13 of the first and fourth memory blocks BLK1 and BLK4 are mapped to the eighteenth and nineteenth logical page addresses LPN18 and LPN19, the table manager 129 can increase a valid count VCNT of the first and fourth memory blocks BLK1 and BLK4 by '1' from an original value OV as shown in FIG. 14.

As described with reference to the operation S320 of FIG. 6, the table manager 129 can register the eighteenth and nineteenth logical page addresses LPN18 and LPN19 related to the first and fourth memory blocks BLK1 and BLK4 to the interval table IT together with an initial count, for example, '3'.

As described with reference to the operation S325 of FIG. 6, the table manager 129 can renew the interval table IT so that a count of the seventeenth logical page address LPN17 related to the second memory block BLK2 previously registered is reduced.

After the first and fourth memory blocks BLK1 and BLK4 are erased, data may be programmed in the first and fourth memory blocks BLK1 and BLK4. The time that data is programmed in the first and fourth memory blocks BLK1 and BLK4 is not limited and thereby "don't care" is illustrated in the first and second tables T1 and T2.

Referring to FIG. 9 again, the memory controller 120 can collect information of memory blocks (or other erase units like sub blocks) being erased until the fourth interrupt signal INT4 is generated after the third interrupt signal INT3 is generated. For example, the memory blocks BLK may not be erased before the fourth interrupt signal INT4 is generated after the third interrupt signal INT3 is generated.

Figure 16:
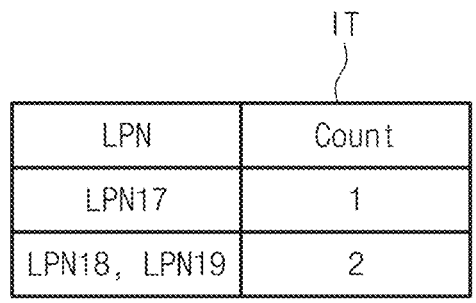

The table manager 129 can renew the tables 131 in response to the fourth interrupt signal INT4. An example that the tables 131 is renewed in response to the fourth interrupt signal INT4 is illustrated in FIG. 16.

Referring to FIGS. 1, 3, 4, 9 and 16, as described with reference to the operation S325 of FIG. 6, the table manager 129 can renew the interval table IT so that a count of the seventeenth logical page address LPN17 related to the second memory block BLK2 previously registered is reduced. The table manager 129 can further renew the interval table IT so that a count of the eighteenth and nineteenth logical page addresses LPN18 and LPN19 related to the first and fourth memory blocks BLK1 and BLK4 previously registered is reduced.

Referring to FIG. 9, the memory controller 120 can collect information of memory blocks (or other erase units like sub blocks) being erased until the fifth interrupt signal INT5 is generated after the fourth interrupt signal INT4 is generated. For example, the memory block BLK3 may be erased before the fifth interrupt signal INT5 is generated after the fourth interrupt signal INT4 is generated. As described with reference to FIGS. 10 and 11, the third memory block BLK3 may be erased after the data stored in the third memory block BLK3 becomes invalid.

Figure 17:
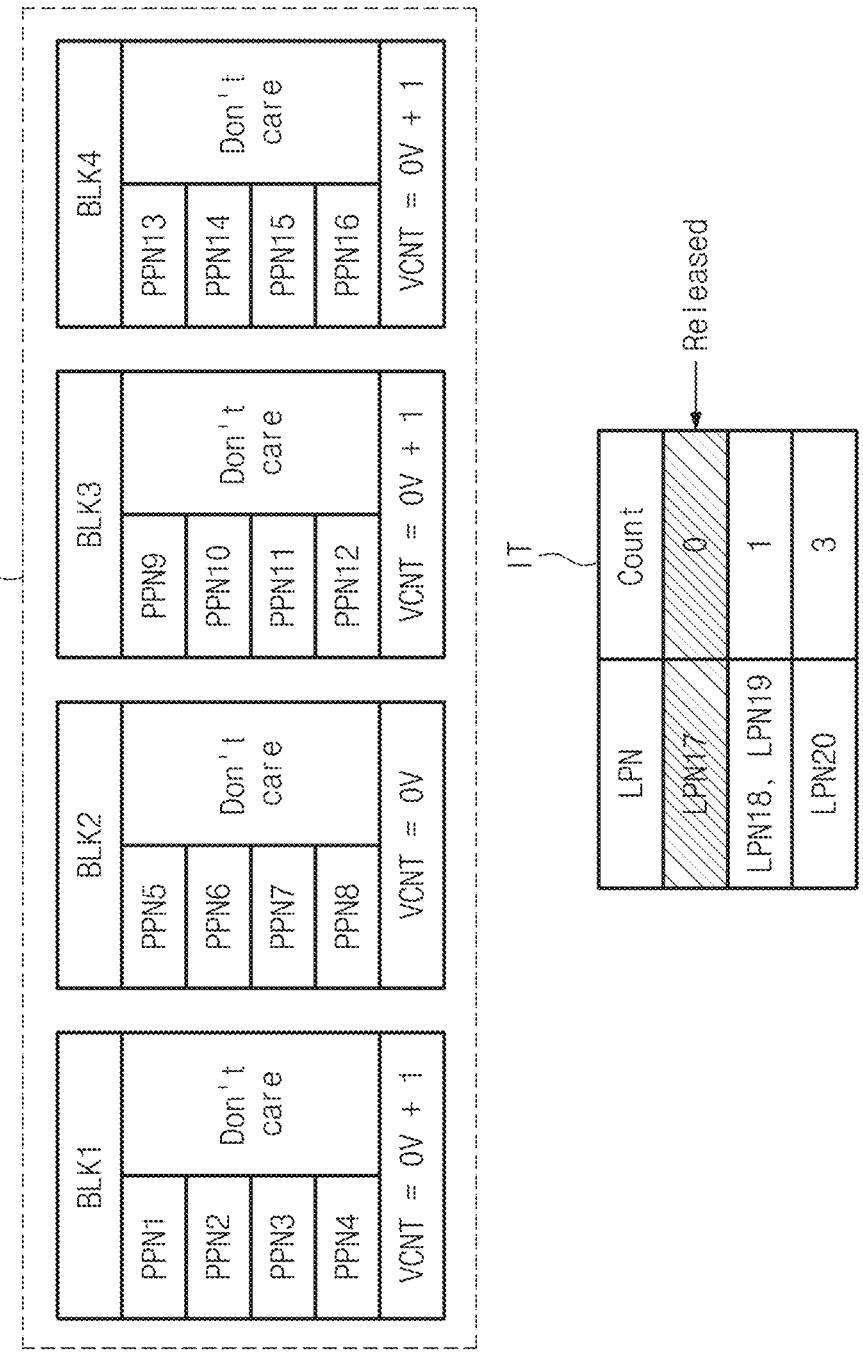

The table manager 129 can renew the tables 131 in response to the fifth interrupt signal INT5. An example that the tables 131 is renewed in response to the fifth interrupt signal INT5 is illustrated in FIGS. 17 and 18.

Referring to FIGS. 1, 3, 4, 9, 17 and 18, as described with reference to the operation S210 of FIG. 5, the table manager 129 sets at least one of pages of the third memory block BLK3 as a virtual valid so that the third memory block BLK3 is erase-prohibited. For example, the table manager 129 can add a twentieth logical page address LPN20 to an OORA (out-of-range area) of the second table T2. The table manager 129 can map the ninth physical page address PPN9 of the third memory block BLK3 with the twentieth logical page address LPN20 of the OORA (out-of-range area).

The table manager 129 can also renew the first table T1. For example, as the ninth physical page addresses PPN9 of the third memory block BLK3 is mapped to the twentieth logical page address LPN20, the table manager 129 can increase a valid count VCNT of the third memory block BLK3 by '1' from an original value OV.

As described with reference to the operation S320 of FIG. 6, the table manager 129 can register the twentieth logical page address LPN20 related to the third memory block BLK3 to the interval table IT together with an initial count, for example, '3'.

As described with reference to the operation S325 of FIG. 6, the table manager 129 can renew the interval table IT so that a count of the seventeenth logical page address LPN17 related to the second memory block BLK2 previously registered is reduced. The table manager 129 can further renew the interval table IT so that a count of the eighteenth and nineteenth logical page addresses LPN18 and LPN19 related to the first and fourth memory blocks BLK1 and BLK4 previously registered is reduced.

In the interval table IT, a count of the seventeenth logical page address LPN17 related to the second memory block BLK2 reaches '0'. Thus, as described with reference to the operation S335 of FIG. 6, the table manager 129 can renew the interval table IT so that a mapping of the fifth physical page address PPN5 of the second memory block BLK2 and the seventeenth logical page address LPN17 is released. As described with reference to the operation S340 of FIG. 6, the table manager 129 can renew the interval table IT so that the seventeenth logical page address LPN17 corresponding to the second memory block BLK2 is released.

As a virtual valid of the fifth physical page address PPN5 of the second memory block BLK2 is released, the table manager 129 can restore a valid count VCNT of the second memory block BLK2 may be to an original value OV.

After the third memory block BLK3 is erased, data may be programmed in the third memory block BLK3. The time that the third memory block BLK3 is programmed is not limited and thereby "don't care" is illustrated in the first and second tables T1 and T2.

Referring to FIG. 9, the memory controller 120 can collect information of memory blocks (or other erase units like sub blocks) being erased until the sixth interrupt signal INT6 is generated after the fifth interrupt signal INT5 is generated. For example, the second memory block BLK2 may be erased before the sixth interrupt signal INT6 is generated after the fifth interrupt signal INT5 is generated. As described with reference to FIGS. 10 and 11, the third memory block BLK3 may be erased after data stored in the third memory block BLK3 becomes invalid.

In response to the sixth interrupt signal INT6, the table manager 129 can renew the tables 131. For example, as described with reference to the operation S210 of FIG. 5, the table manager 129, as the second memory block BLK2 is erased, can set a virtual mapping of the second memory block BLK2 to the second table T2. The table manager 129 can increase a valid count VCNT of the second memory block BLK2 by '1' in the first table T1.

As described with reference to the operation S320 of FIG. 6, the table manager 129 can register a logical page address of an OORA (out-of-range area) related to the second memory block BLK2 in the interval table IT together with an initial count. For example, a new logical page address (for example, LPN21) or a logical page address (for example, LPN17) previously allocated may be virtually mapped to at least one physical page address among the physical page addresses PPN5~PPN8 of the second memory block BLK2.

As described with reference to the operation S325 of FIG. 6, the table manager 129 can reduce a count of the eighteenth and nineteenth logical page addresses LPN18 through LPN20 related to the first, third and fourth blocks BLK1, BLK3 and BLK4 registered in the interval table IT. As a count of the eighteenth and nineteenth logical page addresses LPN18 and LPN19 reaches '0', as described with reference to the operation S325 of FIG. 6, the table manager 129 can release virtual mappings of the first and fourth memory blocks BLK1 and BLK4 from the second table T2. The table manager 129 can renew the first table T1 so that valid counts VCNT of the first and fourth memory blocks BLK1 and BLK4 are restored to an original value OV. As described with reference to the operation S340 of FIG. 6, the table manager 129 can release the eighteenth and nineteenth logical page addresses LPN18 and LPN19 related to the first and fourth memory blocks BLK1 and BLK4 from the interval table IT.

As described above, the memory controller 120 sets the erased memory block BLK as a virtual valid by virtually mapping a physical page address PPN of the erased memory block to a logical page address LPN.

The memory controller 120, as a desired (and/or alternatively predetermined) time interval (for example, a period) has elapsed by the desired (and/or alternatively predetermined) number of times, releases a virtual valid. Thus, an erase of an erase-prohibited memory block BLK is allowed.

According to example embodiments of inventive concepts, the erased memory block BLK is erase-prohibited for the critical time TCR. Thus, an operating method of a storage device having improved reliability is provided. A critical time TCR may be determined by an initial count value being defined according to the operation method of FIG. 2. For example, the critical time TCR may be the product of the initial count value and a period at which the interrupt signals INT1~INT6 are generated.

Figure 19:
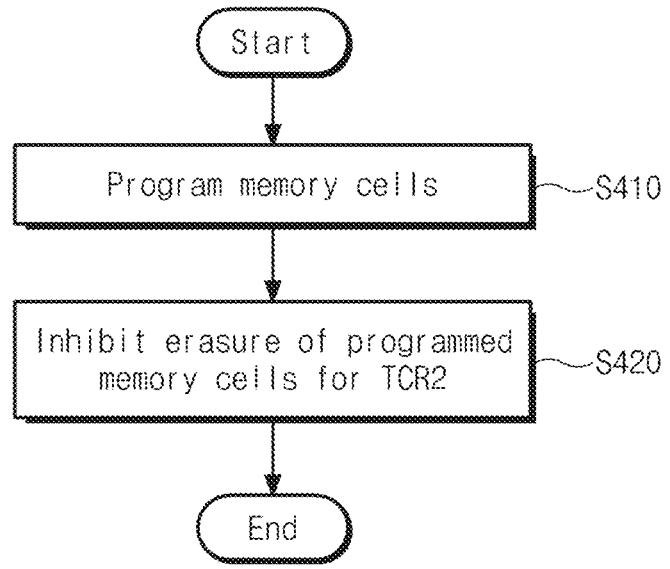
FIG. 19 is a flow chart illustrating an operating method of a storage device in accordance with example embodiments of inventive concepts.

FIG. 19 is a flow chart illustrating an operating method of a storage device in accordance with example embodiments of inventive concepts. Referring to FIGS. 1, 3, 4 and 19, in an operation S410, the memory controller 120 programs memory cells of the nonvolatile memory 110. In an operation S420, the memory controller 120 prohibits an erase of the programmed memory cells for the critical time TCR2.

A time interval until the memory cells of the nonvolatile memory 110 are erased after they are programmed is shorter than the critical time TCR2, a problem that reliability of the memory cells is degraded may occur. The storage device 100 in accordance with example embodiments of inventive concepts improves reliability of the nonvolatile memory 100 by prohibiting an erase of the programmed memory cells MC for the critical time TCR2.

The operation S420 may be programmed in the same manner as that described with reference to FIG. 5 except that an erase operation is replaced with a program operation. For example, as described with reference to the operation S210, as the memory cells MC are programmed, the memory controller 120 can set at least one page among pages of the memory block BLKa to which the programmed memory cells MC belong as a virtual valid. The table manager 129 can set a virtual valid if the memory block BLK, according to a program order of the memory cells MC of the memory block BLKa, upon at least one of programming memory cells (for example, MC1) being programmed first, programming a page being programmed first in pages of the memory cells (for example, MC1) being programmed first, programming memory cells (for example, MC6) being programmed last, programming a page being programmed last in pages of the memory cells (for example, MC6) being programmed last, programming memory cells MC of a desired (and/or alternatively predetermined) order, and programming a page of a desired (and/or alternatively predetermined) order in pages of the memory cells MC of a desired (and/or alternatively predetermined) order.

As described with reference to FIG. 6, the memory controller 120 may prohibit or allow an erase of the memory block BLKa to which the programmed memory cells MC belong using the first and second tables T1 and T2 and the interval table IT.

As described with reference to FIG. 6, the memory controller 120 can set the memory block BLKa as a virtual valid by virtually mapping a physical page address PPN of the memory block BLKa to which the programmed memory cells MC belong with a logical page address LPN of the OORA (out-of-range area). As a desired (and/or alternatively predetermined) time interval (for example, a period) has elapsed as much as the desired (and/or alternatively predetermined) number of times, the memory controller 120 can release a virtual valid. That is, the memory controller 120 can prohibit an erase of the memory block BLKa to which the programmed memory cells MC belong for a second critical time TCR2. The second critical time TCR2 may be determined according to a second initial count value being defined by the operation method of FIG. 19. For example, the second critical time TCR2 may be product of the second initial count value and a period at which the interrupt signals INT1~INT6 are generated.

The operation method of FIG. 19 is performed in the same manner as the operation method described with reference to FIGS. 2 through 18 except that an operation of allowing or prohibiting an erase of the erased memory block BLK is replaced with an operation of allowing or prohibiting an erase of the memory block BLKa to which the programmed memory cells MC belong. Thus, an overlapped description thereof is omitted.

Figure 20:
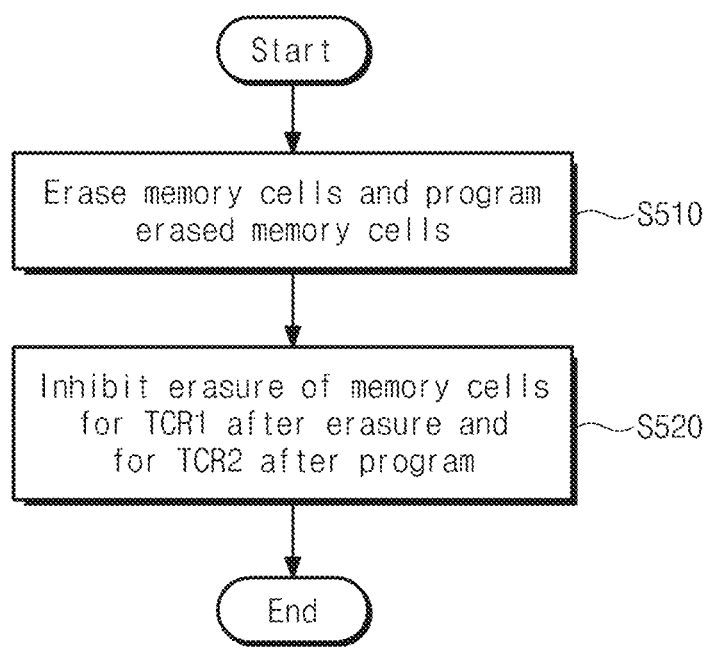
FIG. 20 is a flow chart illustrating an operating method of a storage device in accordance with example embodiments of inventive concepts.

FIG. 20 is a flow chart illustrating an operating method of a storage device in accordance with example embodiments of inventive concepts. Referring to FIGS. 1, 3, 4 and 20, in an operation S510, the memory controller 120 erases memory cells of the nonvolatile memory 110 and programs the erased memory cells.

In an operation S520, the memory controller 120 prohibits an erase of memory cells MC for a first critical time TCR1 after the memory cells MC of the nonvolatile memory 110 are erased. The memory controller 120 also prohibits an erase of memory cells MC for a second critical time TCR2 after the memory cells MC of the nonvolatile memory 110 are erased.

For example, as described with reference to FIGS. 2 through 18, the memory controller 120 can prohibit an erase of the erased memory block BLKa by mapping a first physical page address of the erased memory block BLKa with a first logical page address of the OORA (out-of-range area). The memory controller 120 can also prohibit an erase of the memory block BLKa to which the programmed memory cells MC belong by mapping a second physical page address of the memory block BLKa to which the programmed memory cells MC belong with a second logical page address of the OORA (out-of-range area).

As the first physical page address is mapped with the first logical page address, a valid count VCNT of the erased memory block may increase by '1'. As the second physical page address is mapped with the second logical page address, a valid count VCNT of the memory block to which the programmed memory cells MC belong may increase by '1'. With the lapse of the first critical time TCR1 after the memory block BLKa is erased, a valid count VCNT of the memory block BLKa may decrease by '1'. With the lapse of the second critical time TCR2 after the memory cells MC of the memory block BLKa are erased, a valid count VCNT of the memory block BLKa may decrease by '1'. When a valid count VCNT of the memory block BLKa has an original value OV, an erase of the memory block BLKa may be allowed.

An operation of prohibiting an erase of the erased memory block BLKa and an operation of prohibiting an erase of the memory block BLKa to which the programmed memory cells MC belong may be performed independently of each other.

Figure 21:
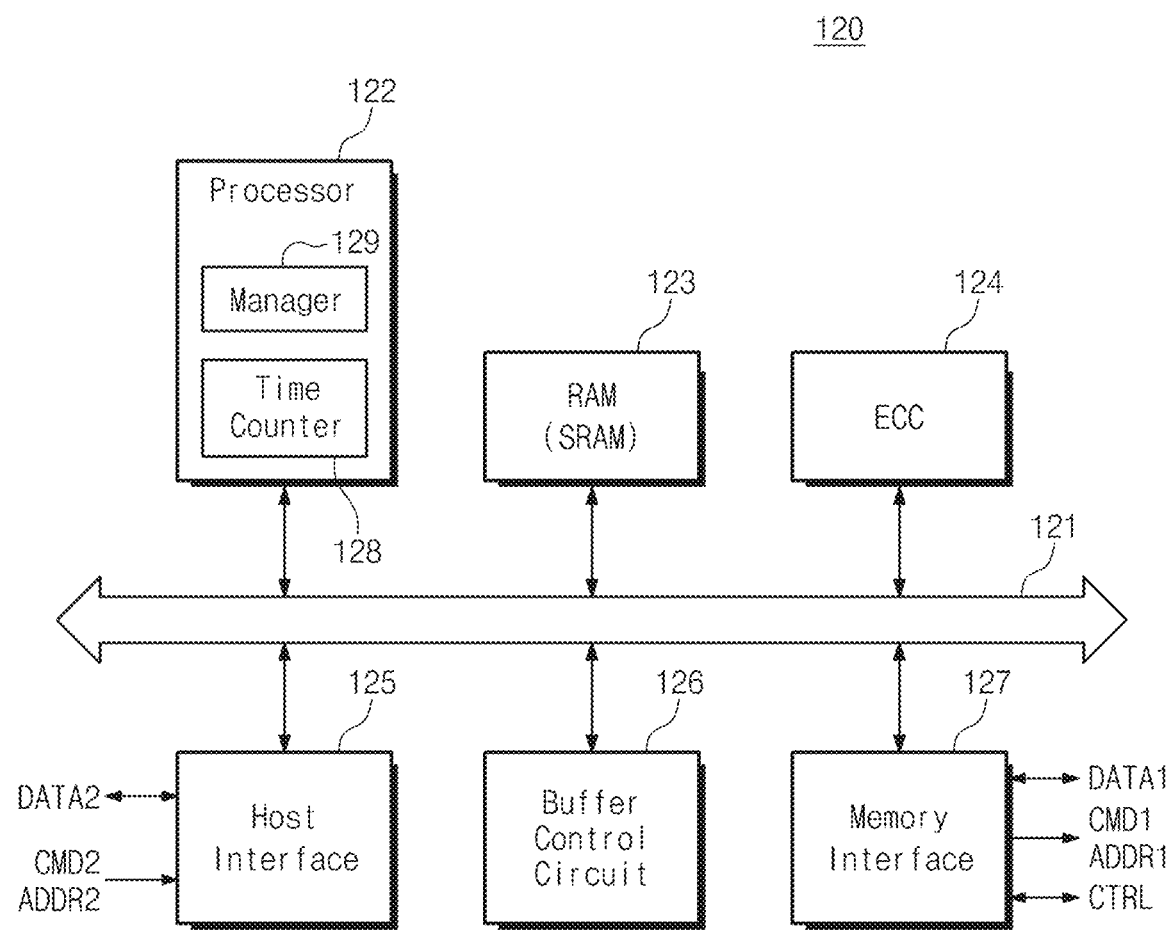
FIG. 21 is a block diagram illustrating a memory controller in accordance with example embodiments of inventive concepts.

FIG. 21 is a block diagram illustrating a memory controller in accordance with example embodiments of inventive concepts. Referring to FIG. 21, the memory controller 120 includes a bus 121, a processor 122, a RAM 123, an error correction block 124, a host interface 125, a buffer control circuit 126, and a memory interface 127.

The bus 121 is configured to provide a channel between constituent elements of the memory controller 120.

The processor 122 can control an overall operation of the memory controller 120 and perform a logical operation. The processor 122 can communicate with an external host through the host interface 125. The processor 122 can store a second command CMD2 or a second address ADDR2 being received through the host interface 125 in the RAM 123. The processor 122 can generate a first command CMD1 and a first address ADDR1 according to the second command CMD2 or the second address ADDR2 stored in the RAM 123 and output the generated first command CMD1 and the generated first address ADDR1 through the memory interface 127.

The processor 122 can output second data DATA2 being received through the host interface 125 through the buffer control circuit 126 or store the second data DATA2 in the RAM 123. The processor 122 can output data stored in the RAM 123 or data being received through the buffer control circuit 126 as first data DATA1 through the memory interface 127. The processor 122 can store the first data DATA1 being received through the memory interface 127 in the RAM 123 or output the first data DATA1 through the buffer control circuit 126. The processor 122 can output data stored in the RAM 123 or data being received through the buffer control circuit 126 as the second data DATA2 through the host interface 125 or output data stored in the RAM 123 or data being received through the buffer control circuit 126 as the first data DATA1 through the memory interface 127.

The processor 122 may be configured to drive the time counter 128 and the table manager 129. For example, the time counter 128 and the table manager 129 each may be embodied in the form of hardware, software or combinations thereof.

The RAM 123 may be used as an operation memory, a cache memory or a buffer memory of the processor 122. The RAM 123 can store codes and commands being executed by the processor 122. The RAM 123 can store data being processed by the processor 122. The RAM 123 may include a SRAM (static RAM).

The error correction block 124 can perform an error correction. The error correction block 124 can generate an error correction code (for example, parity) for performing an error correction based on the first data DATA1 to be output to the memory interface 127 or the second data DATA2 being received from the host interface 125. The first data DATA1 and the parity may be output through the memory interface 127. The error correction block 124 can perform an error correction of the received first data DATA1 using the first data DATA1 and the parity being received through the memory interface 127. The error correction block 124 may be included in the memory interface 127 as a constituent element of the memory interface 127.

The host interface 125 is configured to communicate with an external host device under the control of the processor 122. The host interface 125 can receive the second command CMD2 and the second address ADDR2 from the external host device and exchange the second data DATA2 with the external host device.

The host interface 125 may be configured to perform a communication using at least one of various communication methods such as a universal serial bus (USB), a serial ATA (SATA), a serial attached SCSI (SAS), a high speed interchip (HSIC), a small computer system interface (SCSI), a firewire, a peripheral component interconnection (PCI), a PCI express (PCIe), a nonvolatile memory express (NVMe), a universal flash memory device (UFS), a secure digital (SD), a multimedia card (MMC), an embedded MMC (eMMC), etc.

The buffer control circuit 126 is configured to control the RAM 130 (refer to FIG. 1) under the control of the processor 122. The buffer controller 126 can write data in the RAM 123 and read data from the RAM 130.

The memory interface 127 is configured to communicate with the nonvolatile memory 110 under the control of the processor 122. The memory interface 127 can transmit the first command CMD1 and the first address ADDR1 to the nonvolatile memory 110 and exchange the first data DATA1 and a control signal CTRL with the nonvolatile memory 110.

The RAM 130 may not be provided to the storage device 100. That is, the storage device 100 may not have a separate memory in the outside of the memory controller 120 and the nonvolatile memory 110. The buffer control circuit 126 may not be provided to the memory controller 120. A function of the RAM 130 may be performed by the internal RAM 123 of the memory controller 120.

The processor 122 can control the memory controller 120 using codes. The processor 122 can load codes from a nonvolatile memory (for example, read only memory) being provided to the inside of the memory controller 120. The processor 122 can load codes being received from the memory interface 127.

The bus 121 of the memory controller 120 may be divided into a control bus and a data bus. The data bus may be configured to transmit data in the memory controller 120 and the control bus may be configured to transmit control information such as a command and an address. The data bus and the control bus can be separated from each other and may not interfere with or affect each other. The data bus may be connected to the host interface 125, the buffer control circuit 126, the error correction block 124 and the memory interface 127. The control bus may be connected to the host interface 125, the processor 122, the buffer control circuit 126, the RAM 123 and the memory interface 127.

According to example embodiments of inventive concepts, after memory cells are erased, an erase of the erased memory cells is prohibited for CTR1. Also, after memory cells are programmed, an erase of the programmed memory cells is prohibited for CTR2. Thus, the memory cells are stabilized and an operation method of a storage device having improved reliability is provided.

Although a few example embodiments of inventive concepts have been shown and described, it will be appreciated by those skilled in the art that changes may be made in these embodiments without departing from the principles and spirit of inventive concepts, the scope of which is defined in the appended claims and their equivalents. Therefore, the above-disclosed subject matter is to be considered illustrative, and not restrictive.

What is claimed is:

1. An operation method of a storage device including a nonvolatile memory and a memory controller configured to control the nonvolatile memory, the operation method comprising:
   programming memory cells of the nonvolatile memory using the memory controller; and
   prohibiting an erase of the programmed memory cells for a critical time using the memory controller,
   wherein the prohibiting the erase of the programmed memory cells for the critical time includes:
   mapping at least one physical address of physical addresses of the programmed memory cells to at least one logical address which is not used for a storage area of the storage device.

2. The operation method of claim 1, wherein the prohibiting the erase of the programmed memory cells for the critical time further includes:
   releasing the mapping of the at least one physical address and the at least one logical address after the critical time has elapsed.

3. The operation method of claim 1, wherein the prohibiting the erase of the programmed memory cells for the critical time further includes:
   collecting information of memory blocks being programmed among memory blocks of the nonvolatile memory; and
   periodically registering the information being collected in a slot of an interval table together with an initial count according to a period.

4. The operation method of claim 3, wherein the collecting the information of memory blocks being programmed includes:
   collecting information of memory blocks in which last memory cells are programmed according to a program order of each memory block.

5. The operation method of claim 3, wherein the collecting the information of memory blocks being programmed includes collecting information of memory blocks in which first memory cells are programmed according to a program order of each memory block.

6. The operation method of claim 3, further comprising:
   storing the interval table in the nonvolatile memory before power-off.

7. The operation method of claim 6, further comprising:
   reading the interval table from the nonvolatile memory when power is turned on.

8. The operation method of claim 1, wherein the prohibiting the erase of the programmed memory cells for the critical time further includes:
   mapping physical addresses of the programmed memory cells to logical addresses which is used for the storage area of the storage device.

9. The operation method of claim 8, wherein the prohibiting the erase of the programmed memory cells for the critical time further includes:
   maintaining the mapping of the at least one physical address and the at least one logical address for the critical time even though the mapping of the physical address and the logical addresses is released.

10. An operation method of a storage device including a nonvolatile memory and a memory controller configured to control the nonvolatile memory, the nonvolatile memory including a plurality of memory cells, the operation method comprising:
    erasing the memory cells in one of a plurality of erase operation units of the nonvolatile memory using the memory controller; and at least one of:
    excluding the memory cells in the one of the plurality of erase operation units as an available erase target for a critical period of time using the memory controller, the critical period of time being based on a time elapsed since the memory cells in the one of the plurality of erase operation units were last erased, and programming at least some of the memory cells in the one of the plurality of erase operations units and inhibiting the memory cells in the one of the plurality of erase operation units from being erased for a critical length of time using the memory controller, the critical length of time being based on a time elapsed since the at least some of the memory cells in the one of the plurality of erase operation units were last programmed, wherein the at least one of excluding the memory cells in the one of the plurality of erase operation units as the available erase target and programming at least some of the memory cells in the one of the plurality of erase operation units and inhibiting the memory cells in the one of the plurality of erase operation units from being erased from the critical length of time includes, mapping at least one physical address of physical addresses of the memory cells to at least one logical address which is not used for a storage area of the nonvolatile memory.

11. The operation method of claim 10, wherein the memory cells in the nonvolatile memory are organized into a plurality of memory blocks, the plurality of memory blocks each include a plurality of physical pages, the at least one physical address being at least one physical page address, the at least one logical address being at least one logical page address, the at least one of excluding the memory cells in the one of the plurality of erase operation units as the available erase target and programming at least some of the memory cells in the one of the plurality of erase operation units and inhibiting the memory cells in the one of the plurality of erase operation units from being erased from the critical length of time further includes:

managing a table using the memory controller that maps logical page addresses to the physical pages of the plurality of memory blocks.

12. The operation method of claim 11, wherein the at least one of excluding the memory cells in the one of the plurality of erase operation units as the available erase target and programming at least some of the memory cells in the one of the plurality of erase operation units and inhibiting the memory cells in the one of the plurality of erase operation units from being erased from the critical length of time further includes:

removing the mapping of the at least one physical page address and the at least one logical page address if one of the critical period of time and the critical length of time has elapsed since the mapping of the at least one physical page address and the at least one logical page address.

13. The operation method of claim 12, wherein the at least one of excluding the memory cells in the one of the plurality of erase operation units as the available erase target and programming at least some of the memory cells in the one of the plurality of erase operation units and inhibiting the memory cells in the one of the plurality of erase operation units from being erased from the critical length of time further includes:

prohibiting the removing of the mapping of the at least one physical page address and the at least one logical page address if any one of the physical pages included in the at least one of the plurality of erase operation units is mapped to a virtual page.

14. The operation method of claim 10, wherein the at least one of excluding the memory cells in the one of the plurality of erase operation units as the available erase target for the critical period of time using the memory controller and programming the at least some of the memory cells in the one of the plurality of erase operations units and inhibiting the memory cells in the one of the plurality of erase operation units from being erased for the critical length of time using the memory controller is the excluding the memory cells in the one of the plurality of erase operation units as the available erase target for the critical period of time using the memory controller.

15. The operation method of claim 10, wherein the at least one of excluding the memory cells in the one of the plurality of erase operation units as the available erase target for the critical period of time using the memory controller and the programming the at least some of the memory cells in the one of the plurality of erase operations units and inhibiting the memory cells in the one of the plurality of erase operation units from being erased for the critical length of time using the memory controller is the programming the at least some of the memory cells in the one of the plurality of erase operations units and inhibiting the memory cells in the one of the plurality of erase operation units from being erased for the critical length of time using the memory controller.

16. The operation method of claim 10, wherein the memory cells in the nonvolatile memory are organized into a plurality of blocks, each one of the plurality of blocks includes a plurality of strings, and each one of the strings includes a number of the memory cells stacked on top of each other in a vertical direction between a ground selection transistor and a string selection transistor.

* * * * *